US011696151B2

(12) United States Patent
Prakash et al.

(10) Patent No.: US 11,696,151 B2
(45) Date of Patent: Jul. 4, 2023

(54) SELECTING A PHYSICAL CELL IDENTIFIER IN A SMALL CELL WITHOUT USING RADIO ENVIRONMENT MONITORING

(71) Applicant: CommScope Technologies LLC, Hickory, NC (US)

(72) Inventors: Shiva Prakash, Bengaluru (IN); Ehsan Daeipour, Southborough, MA (US); Nagi Jayaraman Mahalingam, San Diego, CA (US)

(73) Assignee: CommScope Technologies LLC, Hickory, NC (US)

(*) Notice: Subject to any disclaimer, the term of this patent is extended or adjusted under 35 U.S.C. 154(b) by 64 days.

(21) Appl. No.: 17/100,632

(22) Filed: Nov. 20, 2020

(65) Prior Publication Data

US 2021/0195432 A1   Jun. 24, 2021

Related U.S. Application Data

(60) Provisional application No. 62/950,831, filed on Dec. 19, 2019, provisional application No. 62/950,823, filed on Dec. 19, 2019.

(51) Int. Cl.
*H04W 16/22* (2009.01)
*H04W 84/04* (2009.01)

(52) U.S. Cl.
CPC .......... *H04W 16/22* (2013.01); *H04W 84/045* (2013.01)

(58) Field of Classification Search
CPC ..... H04W 16/18; H04W 24/02; H04W 88/18; H04W 48/16; H04W 64/003;
(Continued)

(56) References Cited

U.S. PATENT DOCUMENTS 9,775,088 B2   9/2017   Smith et al.
9,813,924 B2   11/2017  Smith et al.
(Continued)

FOREIGN PATENT DOCUMENTS

CN   105610538 B   4/2018
EP   2223552 B1   7/2017
(Continued)

OTHER PUBLICATIONS

"3GPP, "PCI Selection for NR Cells", 3GPP TSG-RAN3 Meeting #103bis", R3-191591, Apr. 2019, pp. 1 through 3, Huawei, Xi'an, China.
(Continued)

*Primary Examiner* — Jung Liu
(74) *Attorney, Agent, or Firm* — Fogg & Powers LLC

(57) ABSTRACT

A small cell for selecting a physical cell identifier (PCI) includes at least one processor configured to determine a provisioned list of PCI values from a management system. The at least one processor is also configured to sort the PCI values in the provisioned list into a sorted list based on at least one predetermined pattern and modulo X values of the PCI values, where X is a predetermined integer. The at least one processor is also configured to determine an index for each sector implemented by the small cell based on a sector ID for the sector. The at least one processor is also configured to select, for each sector implemented by the small cell, a PCI value from the sorted list based on a sector ID of the sector.

44 Claims, 10 Drawing Sheets

(58) Field of Classification Search
CPC ... H04W 84/18; H04W 36/0061; H04W 8/26; H04W 88/08; H04W 16/22; H04W 16/02; H04W 84/045; H04J 11/0069
See application file for complete search history.

(56) References Cited

U.S. PATENT DOCUMENTS

| | | | |
|---|---|---|---|
| 10,512,008 | B2 | 12/2019 | Deenoo et al. |
| 10,834,608 | B1* | 11/2020 | Yuan ............... H04W 16/18 |
| 11,184,816 | B2 | 11/2021 | Deenoo et al. |
| 2015/0155996 | A1* | 6/2015 | Garcia ............. H04W 72/082 370/329 |
| 2016/0198360 | A1 | 7/2016 | Smith |
| 2018/0063757 | A1* | 3/2018 | Gormley ............ H04W 88/08 |
| 2018/0070247 | A1* | 3/2018 | Gormley .......... H04W 36/0061 |
| 2018/0123660 | A1 | 5/2018 | Jung et al. |
| 2018/0332527 | A1* | 11/2018 | Sun ................. H04W 48/16 |
| 2018/0376342 | A1* | 12/2018 | Macmullan ........ H04W 24/02 |
| 2021/0022013 | A1* | 1/2021 | Yuan ............... H04W 16/18 |

FOREIGN PATENT DOCUMENTS

| | | | |
|---|---|---|---|
| JP | 6026673 | B2 | 11/2016 |
| KR | 101197847 | B1 | 11/2012 |
| WO | 2019070627 | A1 | 4/2019 |

OTHER PUBLICATIONS

3GPP, "Open Issues for Cell Selection and Reselection of NPN cell", 3GPP TSG-RAN WG2 Meeting #108, R2-1914439, Nov. 2019, pp. 1 through 4, CATT, Reno, USA.

3GPP, "PCT Selection for split gNB", 3GPP TSG-RAN3 Meeting #104, R3-192971, May 2019, pp. 1 through 3, Huawei, Reno Nevada.

International Searching Authority, "International Search Report and Written Opinion from PCT Application No. PCT/US2020/061644", from Foreign Counterpart to U.S. Appl. No. 17/100,632, dated Mar. 9, 2021, pp. 1 through 11, Published: WO.

International Searching Authority, "International Search Report and Written Opinion from PCT Application No. PCT/US2020/061654", from Foreign Counterpart to U.S. Appl. No. 17/100,636, dated Mar. 3, 2021, pp. 1 through 10, Published: WO.

Prakash, Shiva et al., "Automatic Configuration of Operational Parameters in Small Cells Without Using Radio Environment Monitoring", U.S. Appl. No. 17/100,636, filed Nov. 20, 2020, pp. 1 through 63, Published: US.

Qualcomm, "Small Cells & UltraSON", Qualcomm Research, Apr. 23, 2014, Qualcomm Technologies, Inc.

Vikram K, "LTE 4G/5G SON (Self Organizing Networks): Physical Cell ID (PCI)", Oct. 9, 2018, pp. 1 through 2, https://lte-son.blogspot.com/2018/10/physical-cell-id-pci.html.

U.S. Patent and Trademark Office, "Office Action", U.S. Appl. No. 17/100,636, dated Sep. 8, 2022, pp. 1 through 35, Published: US.

U.S. Patent and Trademark Office, "Notice of Allowance", U.S. Appl. No. 17/100,636, dated Mar. 6, 2023, pp. 1-12, Published: US.

* cited by examiner

SELECTING A PHYSICAL CELL IDENTIFIER IN A SMALL CELL WITHOUT USING RADIO ENVIRONMENT MONITORING

CROSS-REFERENCE TO RELATED APPLICATIONS

This application claims the benefit of U.S. Provisional Patent Application Ser. No. 62/950,831 filed on Dec. 19, 2019, entitled "AUTOMATIC CONFIGURATION OF OPERATIONAL PARAMETERS IN SMALL CELLS WITHOUT USING RADIO ENVIRONMENT MONITORING"; and U.S. Provisional Patent Application Ser. No. 62/950,823 filed on Dec. 19, 2019, entitled "SELECTING A PHYSICAL CELL IDENTIFIER IN A SMALL CELL WITHOUT USING RADIO ENVIRONMENT MONITORING", both of which are incorporated herein by reference in their entireties.

BACKGROUND

Various parameters (e.g., physical cell identifiers (PCIs)) may be selected or assigned for each cell/sector implemented by a base station. In some configurations, when a parameter for a cell is the same as a neighboring cell, interference is introduced. Accordingly, it may be beneficial to select parameters for a cell (e.g., PCI) to avoid collisions with neighboring cells.

SUMMARY

A small cell for selecting a physical cell identifier (PCI) includes at least one processor configured to determine a provisioned list of PCI values from a management system. The at least one processor is also configured to sort the PCI values in the provisioned list into a sorted list based on a predetermined pattern and modulo X values of the PCI values, where X is a predetermined integer. The at least one processor is also configured to determine an index for each sector implemented by the small cell based on a sector ID for the sector. The at least one processor is also configured to select, for each sector implemented by the small cell, a PCI value from the sorted list based on a sector ID of the sector.

A small cell for selecting a physical cell identifier (PCI) includes at least one processor configured to determine a provisioned list of PCI values. The at least one processor is also configured to insert, into a sorted list, at least one of the PCI values in the provisioned list during a first selection round, wherein the at least one of the PCI values is selected for insertion based on a predetermined pattern and modulo X values of elements in the provisioned list, where X is a predetermined integer. When all the PCI values in the provisioned list have not been inserted into the sorted list, the at least one processor is also configured to perform at least one additional selection round, one or more of the additional selection rounds being performed based on at least one different predetermined pattern. The at least one processor is also configured to select, for each sector implemented by the small cell, a PCI value from the sorted list based on a sector ID of the sector.

DRAWINGS

Understanding that the drawings depict only exemplary configurations and are not therefore to be considered limiting in scope, the exemplary configurations will be described with additional specificity and detail through the use of the accompanying drawings, in which.

Figure 1A:
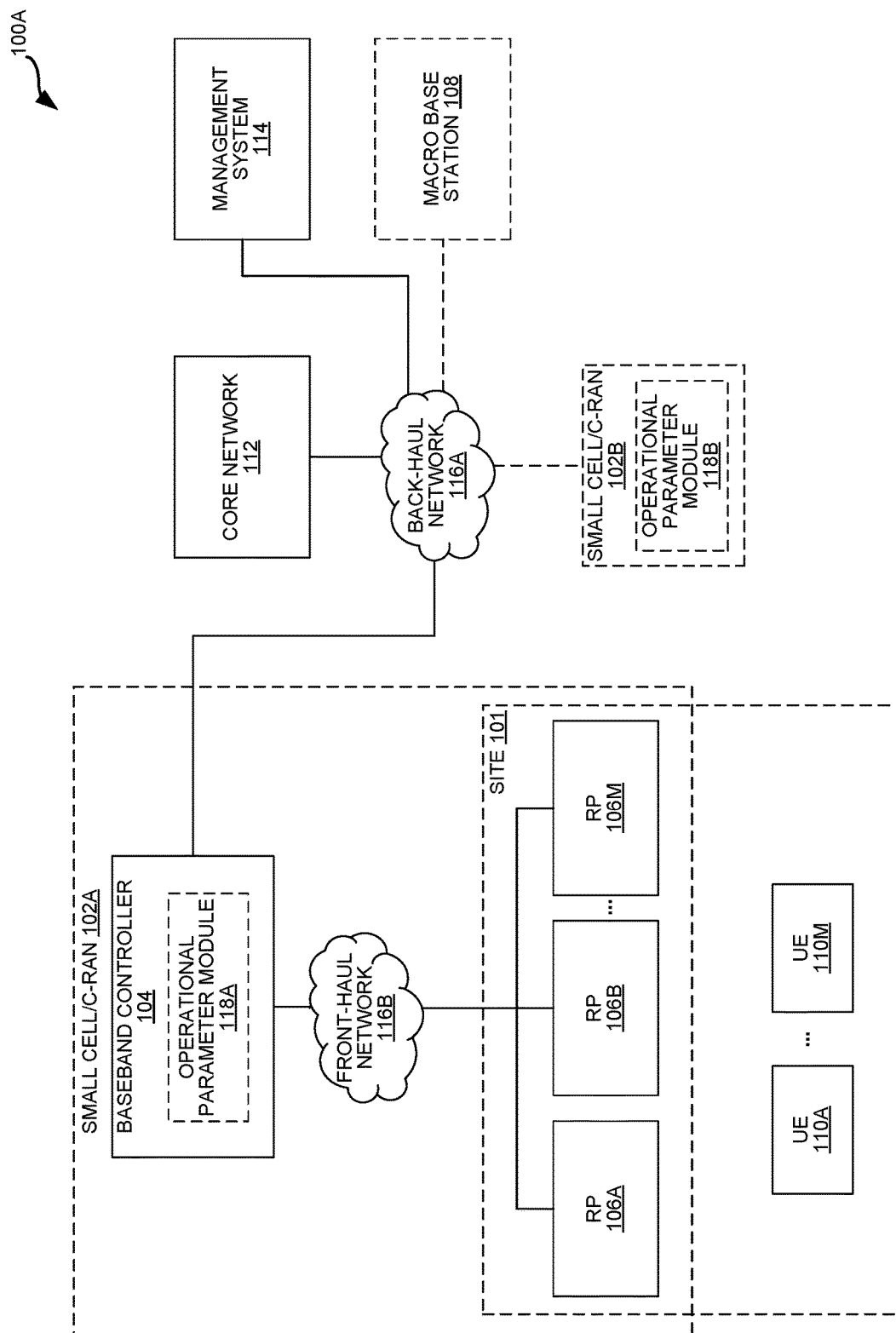
FIG. 1A is a block diagram illustrating an exemplary configuration of a system, which includes 3GPP Fourth Generation (4G) components, implementing automatic configuration of operational parameters in a small cell.

In accordance with common practice, the various described features are not drawn to scale but are drawn to emphasize specific features relevant to the exemplary configurations.

DETAILED DESCRIPTION

Communication systems can include different types of base stations, such as small cells and/or macro base stations. Small cells are generally lower-power, shorter-range, and can serve fewer max concurrent users than macro base stations. For example, small cell(s) may be used to fill in coverage gaps in macro base station coverage, e.g., indoors, in urban environments, etc.

A cloud radio access network (C-RAN) is one implementation of a base station with a distributed architecture. A C-RAN uses a baseband controller that communicates with multiple remote units (also referred to here as radio points (RPs)) in order to provide wireless service to various items of user equipment (UEs). In some cases, a C-RAN may be considered a type of small cell because it is generally shorter range and serves fewer max concurrent users than a macro base station.

Various operational parameters are configured for small cells, such as physical cell identifier (PCI), root sequence index (RSI), and/or tracking area code (TAC). When neighboring cells use identical PCI or RSI on the same frequency channel, known as a "collision", interference can occur. Therefore, in the co-channel LTE or 5G system, it is beneficial for each cell in a cluster (nearby grouping) to use unique operational parameters (e.g., PCI and RSI) compared to neighboring cells in the cluster, thus enabling surrounding UEs to differentiate radio signals sent from different cells.

In a small cell environment, network monitoring (also referred to as network listening) is often used to enable small cells to perform self-configuration of its operational parameters, such as PCI, RSI, TAC, etc. Network monitoring is a process where a small cell listens to the downlink transmissions from neighboring base stations on one or more provisioned frequencies. Network listening is also commonly referred to as Radio Environment Monitoring (REM). In addition to REM scans, a small cell can also employ Automatic Neighbor Relation (ANR) functions using mobile devices attached to the small cell to fine tune or re-adjust its operational parameters periodically.

However, in a multi-operator deployment, such as in C-RAN deployments where the remote units house more than one radio modules or units, enabling use of operator-specific and multi-frequency bands, it might not be viable to include a REM functionality in the remote units. Accordingly, the present systems and methods automatically configure initial operational parameters of a small cell in the absence of REM functionality (including REM functionality being disabled). Additionally or alternatively, the techniques described herein could also be used to configure non-overlapping transmission opportunities for other configurations (such as sounding reference signal (SRS)) such that neighboring cell transmissions do not interfere with each other.

Specifically, the present systems and methods use a unique BC (baseband controller) ID assigned to a small cell (e.g., in a cluster) for self-configuration of operational parameters such as PCI and/or RSI. While the examples herein are described in the context of configuring PCI, the BC ID could additionally or alternatively be used to derive non-overlapping transmission opportunities for other configurations (such as SRS, etc.) such that transmissions from neighboring small cells (in a cluster) do not interfere with each other. For example, the BC ID could be used as an offset value so that transmission opportunities (e.g., for SRS, etc.) for neighboring small cells in a cluster do not overlap in time and/or frequency and, therefore, do not interfere with each other, e.g., the sorting herein can ensure that transmission opportunities for neighboring small cells are orthogonal in time and/or frequency.

Modulo X (also called "mod-X") values (or remainders) are referred to herein. A mod-X value is the result of a mod-X operation, which determines a remainder after dividing a number by the integer X. For example, the mod-X value of 7 (mod-X(7)) would be the remainder after dividing 7 by X, i.e., if X=3, mod-3(7)=1.

Example 4G System

FIG. 1A is a block diagram illustrating an exemplary configuration of a system 100A, which includes 3GPP Fourth Generation (4G) components, implementing automatic configuration of operational parameters in a small cell 102. The system 100A includes a cluster of small cells 102A-B and, optionally, at least one macro base station 108. In some configurations, a small cell can be implemented with a cloud radio access network (C-RAN) 102A. In some configurations, the system 100A may include a cluster of C-RANs 102A, each implementing a small cell 102.

In LTE, a base station may be referred to as an "eNodeB", although the present systems and methods can alternatively or additionally be used with systems implementing 3G and/or 5G air interfaces. In some configurations, a small cell 102 may also be referred to as a Home eNodeB (HeNB), e.g., when it implements the 3GPP Long Term Evolution (LTE) air interface. However, it is understood that the system 100A can include any number and any type of base stations.

In the exemplary configuration shown in FIG. 1A, the C-RAN 102A employs at least one (and optionally multiple) baseband unit 104 and multiple radio points (RPs) 106A-M that serve at least one cell (also referred to as a sector). A C-RAN 102A may also be referred to herein as a "C-RAN system," an "eNodeB," a "base station," and/or a "small cell." The baseband unit 104 is also referred to herein as a "baseband controller" 104, just a "controller" 104, or a "BC" 104. Each RP 106A-M may include or be coupled to at least one antenna via which downlink RF signals are radiated to UEs 110A-M and via which uplink RF signals transmitted by UEs 110 are received. Furthermore, where an action is described as being performed by a C-RAN 102A, it may be performed in the baseband controller 104 and/or at least one RP 106A-M.

The RPs 106A-M and UEs 110 connected to (e.g., provided wireless service by) the C-RAN 102A may be located at a site 101. The site 101 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). In some configurations, a cluster of C-RANs 102A in the system 100A may be deployed in a single building, e.g., a first C-RAN 102A on a first floor, a second C-RAN 102A on a second floor, and so on.

It should be noted that the baseband controller 104 may or may not be located at the site 101 (with the RPs 106). For example, the baseband controller 104 may be physically located remotely from the RPs 106A-M (and the site 101) in a centralized bank of baseband controllers 104. Additionally, the RPs 106A-M are preferably physically separated from each other within the site 101, although they are each communicatively coupled to the baseband controller 104.

Each UE 110 may be a computing device with at least one processor that executes instructions stored in memory, e.g., a mobile phone, tablet computer, mobile media device, mobile gaming device, laptop computer, vehicle-based computer, a desktop computer, etc. It should be noted that any number of UEs 110 (e.g., M=1-1,000) may be present at the site 101.

The C-RAN(s) 102A may be coupled to the core network 112 of each wireless network operator over an appropriate back-haul network 116A. For example, the Internet (or any other ETHERNET network) may be used for back-haul between the system 100A and each core network 112. However, it is to be understood that the back-haul network 116A can be implemented in other ways.

In some configurations, the system 100A may be implemented as a Long Term Evolution (LTE) radio access network providing wireless service using an LTE air interface. However, it should be noted that the present systems and methods may be used with other wireless protocols, e.g., 2G, 3G, 4G, 5G. LTE is a 4G standard defined by the Third Generation Partnership Project (3GPP) standards organization. In the LTE configuration, the C-RAN 102A may be used to implement an LTE Evolved Node B (also referred to here as an "eNodeB" or "eNB") or a Home eNodeB (HeNB). The eNodeB or HeNB may be used to provide UEs 110 with mobile access to the wireless network operator's core network 112 to enable UE 110 to wirelessly communicate data and voice (using, for example, Voice over LTE (VoLTE) technology).

Also, in an exemplary LTE configuration, each core network 112 may be implemented as an Evolved Packet Core (EPC) 112 comprising standard LTE EPC network elements such as, for example, a mobility management entity (MME) and a Serving Gateway (SGW) and, optionally, a Home eNodeB gateway (HeNodeB GW) (not shown) and a Security Gateway (SeGW) (not shown).

Moreover, in an exemplary LTE configuration, the baseband controller 104 may communicate with the MME and SGW in the EPC core network 112 using the LTE S1 interface and communicates with eNodeBs using the LTE X2 interface. For example, the baseband controller 104 can communicate with an outdoor macro base station 108 via the LTE X2 interface.

The baseband controller 104 and RPs 106A-M can be implemented so as to use an air interface that supports one or more of frequency-division duplexing (FDD) and/or time-division duplexing (TDD). Also, the baseband controller 104 and the RPs 106A-M can be implemented to use an air interface that supports one or more of the multiple-input-multiple-output (MIMO), single-input-single-output (SISO), and/or beam forming schemes. For example, the baseband controller 104 and the RPs 106A-M can implement one or more of the LTE transmission modes. Moreover, the baseband controller 104 and the RPs 106A-M can be configured to support multiple air interfaces and/or multiple wireless operators.

In some configurations, the front-haul network 116B that communicatively couples each baseband controller 104 to the one or more RPs 106A-M is implemented using a standard ETHERNET network. However, it is to be understood that the front-haul network 116B can be implemented in other ways. The front-haul network 116B may be implemented with one or more switches, routers, and/or other networking devices.

Data can be front-hauled between the baseband controller 104 and RPs 106A-M in any suitable way (for example, using front-haul interfaces and techniques specified in the Common Public Radio Interface (CPRI) and/or Open Base Station Architecture Initiative (OBSAI) family of specifications).

The Third Generation Partnership Project (3GPP) has adopted a layered model for the LTE radio access interface. Generally, the baseband controller 104 and/or RPs 106A-M perform analog radio frequency (RF) functions for the air interface as well as digital Layer-1 (L1), Layer-2 (L2), and/or Layer-3 (L3), of the 3GPP-defined LTE radio access interface protocol, functions for the air interface. In some configurations, the Layer-1 processing for the air interface may be split between the baseband controller 104 and the RPs 106A-M, e.g., with L2-L3 functions for the air interface being performed at the baseband controller 104.

A small cell 102 can implement one or more cells (or sectors). Each cell (or sector) implemented by a small cell 102 may be associated with various operational parameters, e.g., a physical cell identifier (PCI), a root sequence index (RSI), etc. The operational parameters for a cell may be assigned to or selected by the small cell 102 implementing the cell.

Small cells 102 (e.g., C-RANs 102A) may be clustered in relative proximity to each other, e.g., in a building. In this type of clustered environment, the system 100A may also include at least one management system 114 (e.g., a HeNB management system (HeMS) and/or a device management system (DMS)), which is used to provide configuration to and receive information from the small cells 102. In some configurations, the management system 114 is an operations, administration, and management (OAM) system/network.

A suitable protocol (such as TR-069) and a suitable data model (such as TR-196) may be used for communicating information between the management system 114 and the small cells 102. For example, if an operator wishes to configure a small cell 102 with a pre-determined PCI or RSI value, it can be pushed from the management system 114 and provisioned on the small cell 102. In another mode, the operator (e.g., via the management system 114 or manually on the small cell 102) also can provide a list of operational parameters, usually orthogonal to the macro configuration, (e.g., a list of PCIs, RSIs), after which the small cells 102 choose one from the given list.

In the absence of REM or inter-small-cell communication in the cluster, the autonomous selection of operational parameters is especially useful. In these types of automatic selection scenarios, small cells can select their own operational parameters (e.g., from a list provided by the management system 114) to ensure that there is no collision in the chosen operational values with those of neighboring small cells 102 in the network cluster.

Each small cell 102 is given a BC ID (that is unique within a cluster) from the management system 114 or configured directly at the small cell 102, e.g., with input from the operator or installer of the larger system 100A. For example, in a C-RAN 102A, the BC ID may be assigned to the baseband controller 104 (that implements one or more cells). A Sector ID is also assigned to each cell/sector implemented by a small cell 102. The Sector ID for the first sector is usually chosen to be equal to the BC ID; the Sector ID for the remaining sectors are chosen incrementally. Small cells 102 usually implement one or two sectors but can implement more than two in some configurations.

The BC IDs for the BCs 104 in the cluster are configured in an arithmetic progression, and the increment or difference is defined by the maximum number of sectors any BC 104 in the cluster can support. For example, if the small cells 102 implement two sectors each, then first BC ID in the system is 1 (implementing sectors with Sector IDs of 1 and 2), then second BC ID is the first BC ID+2=3 (and that BC implements sectors with Sector IDs of 3 and 4).

According to a first configuration of the present systems and methods, the BCs 104 would then use the Sector IDs to self-configure the PCI and/or RSI for its cells/sectors from a configured list of PCIs or RSIs, respectively. Specifically, each BC 104 may: (1) determine a Sector ID for each sector the BC 104 implements; (2) receive a list of provisioned operational parameters, e.g., from an operator via the management system 114; (3) sort the list of provisioned operational parameters into a sorted list (e.g., based on the modulo X (mod-X) values of the elements in the list); and (4) assign each operational parameter, in the sorted list of operational parameters, to the sector(s) using each Sector ID as the index in the sorted list.

The planning of PCIs, particularly, has a strong impact on the performance of the system 100A because a direct PCI collision (or mod-3 PCI collision where PCIs of neighboring cells have the same remainder when divided by three) results in interference and degrades system performance. An incorrect assignment might result in two neighboring cells of the same operating frequency having the same PCI resulting in what is referred to as a PCI confusion scenario, which degrades neighbor detection and impacts mobility. On the other hand, a mod-3 PCI collision (in 4G systems with 2 or 4 antennas) or a mod-6 collision (in systems with single antennas) causes pilot pollution and impacts downlink transmissions.

However, the present systems and methods have advantages over other non-REM solutions for configuring PCI in a cluster of small cells 102 because it does not require complex syncing mechanisms between the BCs 104 in a cluster. Specifically, in a second configuration of the present systems and methods, each BC 104 selects a non-interfering PCI (e.g., from a provisioned PCI list from the management system 114) for use while bringing up its cell. A goal of this selection is to select a PCI for a cell/sector such that it does not have a direct or a mod-3 conflict with a nearby small cell's sector operating on the same frequency. This automated selection includes fashioning a provisioned PCI list (e.g., from the management system 114) according to the given deployment scenario. For example, depending upon the number of sectors configured for the BC 104, the provisioned PCI list (also referred to as an input PCI vector) is sorted differently to achieve optimal selection between the BCs 104 in a cluster.

Example 5G System

Figure 1B:
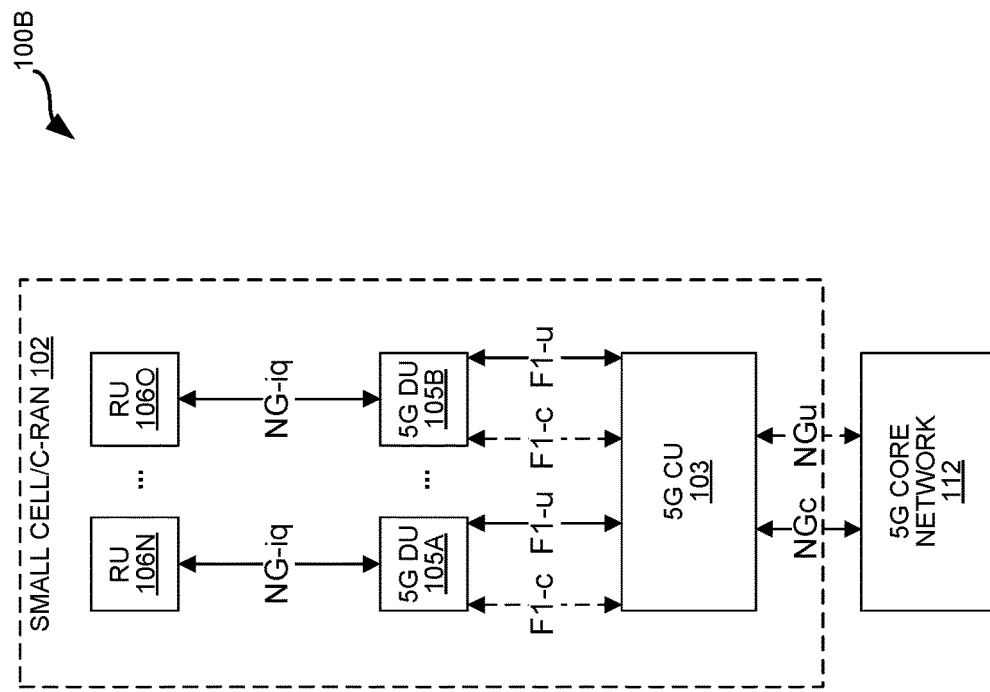
FIG. 1B is a block diagram illustrating an exemplary configuration of a system, which includes 3GPP Fifth Generation (5G) components, implementing automatic configuration of operational parameters in a small cell.

FIG. 1B is a block diagram illustrating an exemplary configuration of a system 100B that includes 3GPP Fifth Generation (5G) components. Optionally, the system 100B may additionally include 4G components. Each of the components may be implemented using at least one processor executing instructions stored in at least one memory. In some configurations, at least some of the components are implemented using a virtual machine.

Fifth Generation (5G) standards support a wide variety of applications, bandwidth, and latencies while supporting various implementation options. In the system 100B, interfaces denoted with "-c" or simply "c" (illustrated with dashed lines) provide control plane connectivity, while interfaces denoted with "-u" or simply "u" (illustrated with solid lines) provide user plane connectivity. More explanation of the various devices and interfaces in FIG. 1B can be found in 3GPP TR 38.801 Radio Access Architecture and Interfaces, Release 14 (available at https://portal.3gpp.org/desktopmodules/Specifications/SpecificationDetails.aspx?specificationId=3056), which is incorporated by reference herein.

FIG. 1B illustrates a small cell/C-RAN 102 implementing an example of a 5G Next Generation NodeB (gNB). The architecture of a Next Generation NodeB (gNB) is partitioned into a 5G Central Unit (CU) 103, one or more 5G Distributed Unit (DU) 105A-B and one or more 5G Remote Units (RU) 106N-O. A 5G Central Unit (CU) 103 is a node that includes the gNB controller functions such as the transfer of user data, mobility control, radio access network sharing, positioning, session management, etc. The 5G CU 103 controls the operation of the Distributed Units (DUs) 105 over an interface (including F1-c and F1-u for the control plane and user plane, respectively).

The Distributed Units (DUs) 105 may be nodes that implement a subset of the gNB functions, depending on the functional split (between CU 103 and DU 105). In some configurations, the L3 processing (of the 5G air interface) may be implemented in the CU 103 and the L2 processing (of the 5G air interface) may be implemented in the DU 105. The operation of each DU 105 is controlled by a CU 103. The functions of the DU 105 may include Radio Link Control (RLC), portions of Medium Access Control (MAC) and/or portions of the physical (PHY) layer functions. A Distributed Unit (DU) 105 can optionally offload some of its PHY (L1) processing (of the 5G air interface) to RUs 106N-O.

In FIG. 1B, the C-RAN 102 implementing the example Next Generation NodeB (gNB) includes a single CU 103, which handles control plane functions and user plane functions. The 5G CU 103 (in the C-RAN 102) may communicate with at least one wireless service provider's Next Generation Cores (NGC) 112 using 5G NGc and 5G NGu interfaces. In some 5G configurations (not shown), a 5G CU is split between a CU-C that handles control plane functions and a CU-U that handles user plane functions.

In some 5G configurations, the RUs (RUs) 106N-O may communicate baseband signal data to the DUs 105 on an NG-iq interface. In some 5G configurations, the RUs 106N-O may implement at least some of the L1 and/or L2 processing. In some configurations, the RUs 106N-O may have multiple ETHERNET ports and can communicate with multiple switches.

Any of the interfaces in FIG. 1B may be implemented using a switched ETHERNET (or fiber) network. Additionally, if multiple CUs 103 are present (not shown), they may communicate with each other using any suitable interface, e.g., an Xn (Xn-c and Xn-u) and/or X2 interface. A fronthaul interface may facilitate any of the NG-iq, F1-c, and/or F1-u interfaces in FIG. 1B.

In some configurations, the CU 103 and/or DU(s) 105 may include an operational parameter module 118 configured to select operational parameters (e.g., PCI and/or RSI) for the CU 103 and/or DU(s) 105, as described herein. The operational parameter module 118 may be implemented using at least one processor executing instructions stored in at least one memory in the CU 103 and/or DU(s) 105.

Operational Parameter Selection

Figure 2:
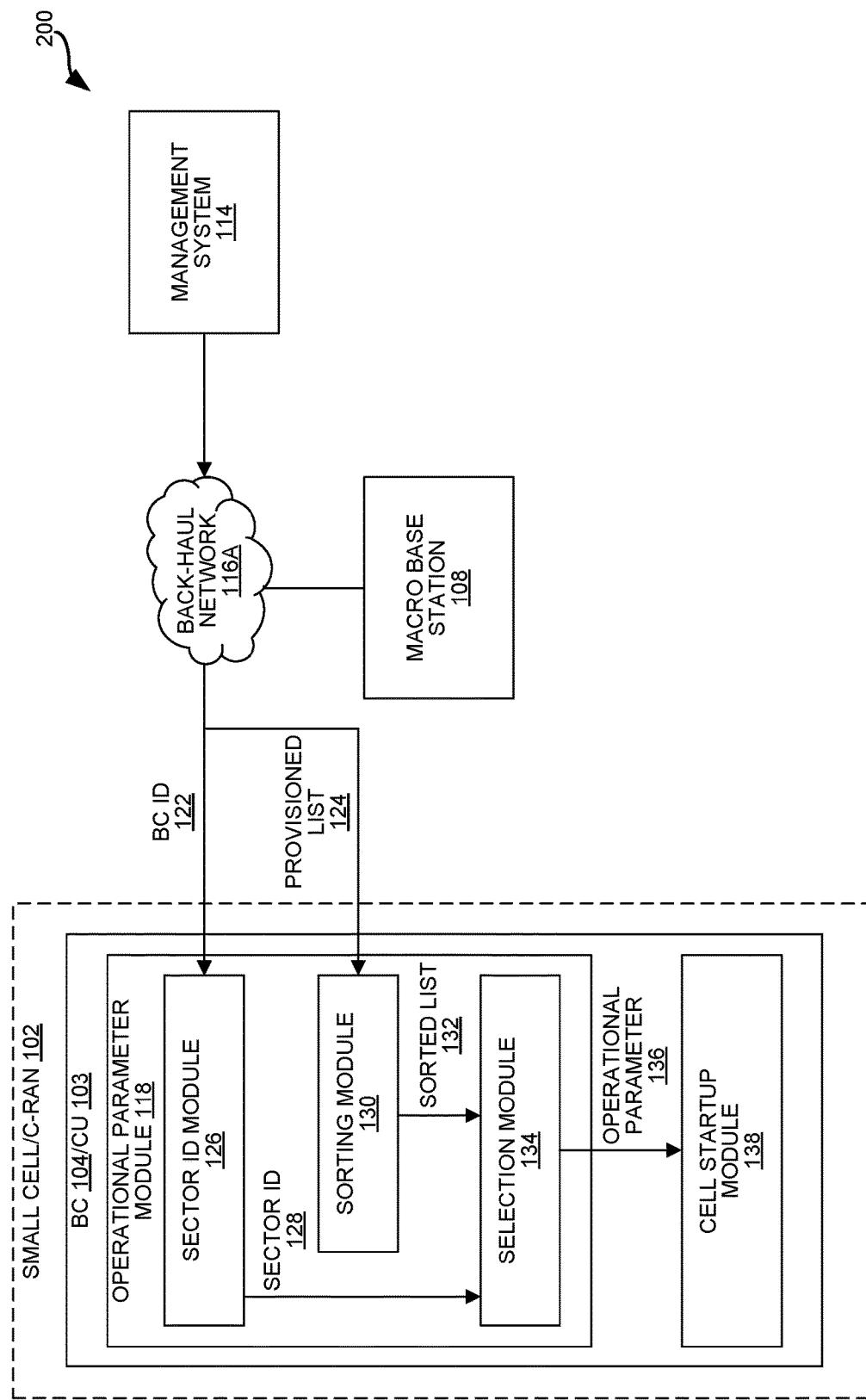
FIG. 2 is a block diagram illustrating a system implementing automatic configuration of operational parameters in a small cell (without REM)

FIG. 2 is a block diagram illustrating a system 200 implementing automatic configuration of operational parameters in a small cell 102 (without REM). The system 200 includes at least one C-RAN 102, each with (1) a BC 104 (if the C-RAN 102 implements an LTE air interface) or a CU 103 and DU(s) 105 (if the C-RAN 102 implements a 5G air interface); and (2) a number of RPs 106A-M (if the C-RAN 102 implements an LTE air interface) or a number of RUs 106N-O (if the C-RAN 102 implements a 5G air interface), although not shown in FIG. 2. Although a single C-RAN 102 is shown in FIG. 2, there may be a cluster of C-RANs 102, each having a respective BC 104/CU 103 implementing at least one cell/sector. It is understood that the system 200 can include any number and any type of base stations, e.g., small cells 102, macro base stations 108, etc.

In a co-channel system (e.g., a co-channel LTE system), it is beneficial for each cell in a cluster to have a unique operational parameter (such as PCI and RSI), thereby enabling UEs 110 to differentiate radio signals of different cells. Moreover, for PCI selection, other rules such as a mod-3 or mod-6 selection rule may be applied to get a better isolation of interference. For example, a mod-3 selection rule means that PCIs (or RSIs) assigned to neighboring cells would have a different remainder when divided by 3. Similarly, a mod-6 selection rule means that PCIs (or RSIs) assigned to neighboring cells would have a different remainder when divided by 6. Even though the mod-3 operator is used throughout the description, other mod-X operators can be used instead, where X is a predetermined integer, e.g., mod-2, mod-4, mod-5, mod-6, etc.

In the absence of REM or inter-BC (or inter-CU) communication, the BC 104/CU 103 needs to autonomously configure itself with operational parameters (e.g., PCI and RSI) that don't interfere or clash with those of its neighbors. Specifically, an operational parameter module 118 in a BC 104/CU 103 may include a Sector ID module 126, a sorting module 130, and a selection module 134 to select operational parameter(s) based on (1) a BC ID 122 assigned to the BC 104/CU 103; and (2) a provisioned list 124 received from the management system 114 (e.g., via the back-haul network 116). Alternatively, the BC ID 122 and/or the provisioned list 124 can be locally configured instead of received from the management system 114, e.g., where a remote management system 114 is not present and/or functioning.

The Sector ID module 126 may receive the BC ID from the management system 114 and determine a Sector ID 128 for each sector implemented by the BC 104/CU 103. BC IDs 122 for the BC 104/CU 103 in the cluster are configured in an arithmetic progression, the increment or difference defined by the maximum number of sectors any BC 104/CU 103 in the cluster can support, e.g., defined by the management system 114. For example, if the BC 104/CU 103 implements two sectors, then the Sector ID 128 for sector 1 is the same as the BC ID 122, and the Sector ID 128 for sector 2 is BC ID+1.

If two BCs 104/CUs 103 have BC IDs 122 that are in the same color group, their operational parameters 136 (e.g., PCIs) will also likely collide. So, it is desirable to avoid BCs 104/CUs 103 in the same color group having the same operational parameters (e.g., PCIs). Therefore, if any two BCs 104/CUs 103 are going to be co-channel (operate on the same frequency channel), their BC IDs 122 may be configured such that they have unique color group indices. A color group index (CG) may be computed as mod(BC ID 122, X*num_sectors) for any given small cell 102, where num_sectors is the number of sectors implemented by the small cell, and X is a predetermined integer, e.g., 2, 4, etc. In other words, the CG of a small cell 102 may be the remainder after dividing the BC ID 122 by (X times the number of sectors implemented by the small cell 102). Thus, for mod-3 operation, it can be ensured that a maximum of 3 co-channel BCs 104/CUs 103 can have a unique color group index (CG). Or, for mod-4 operation, it can be ensured that a maximum of 4 co-channel BCs 104/CUs 103 can have a unique color group index (CG). If possible, the BC IDs 122 are chosen (e.g., by an operator at the management system 114) such that two BCs 104/CUs 103 with the same color group index (CG) have maximum geographic distance between each other.

The sorting module 130 may receive and sort the provisioned list 124 from the management system 114 to determine a sorted list 132 (from which the BC 104/CU 103 will select an operational parameter 138). The provisioned list 124 (or provisioned input vector) of length N is the same for all small cells 102 in a cluster, where each element in the provisioned list 124 represents operational parameter values, e.g., PCIs or RSIs. The operator may provision a separate input vector (provisioned list 124) for macro cells 108 in the system 200 than for small cells 102.

In some configurations, an operator inputs or otherwise indicates the provisioned list 124 at the management system 114. The provisioned list 124 is then sorted using at least one sorting rule. In a first example, the at least one sorting rule specifies that consecutive elements (e.g., PCI values) in the sorted list 132 are not the same, e.g., to avoid direct collision of neighboring cells. In a second example, the at least one sorting rule specifies that consecutive elements (e.g., PCI values) in the sorted list 132 have different mod-X (e.g., mod-3) values. In other words, the at least one sorting rule according to the second example specifies that consecutive elements in the sorted list 132 have different remainders when divided by a predetermined integer (X) in order to avoid interference between neighboring cells, thus ensuring that operational parameters (e.g., PCIs or RSIs) of adjacent cells do not have a mod-X collision.

As an example, the provisioned list 124 may include N=6 elements: [89 116 120 123 130 202]. After sorting, the sorted list 132 may be [202 116 123 130 89 120]. Alternatively, instead of receiving the provisioned list 124 and sorting it at the BC 104/CU 103, the operational parameter module 118 may receive the sorted list 132 from the management system 114.

Once a sorted list 132 is determined or received, a selection module 134 may select an operational parameter 136 from the sorted list 132. The BC 104/CU 103 can select (self-assign) their operational parameter using the Sector ID(s) 128 of the cells/sectors it implements, thus achieving unique assignment among neighboring cells.

A mod-N sector index (Sector_index) may be computed as Sector_index=mod (Sector ID 128, N). In other words, the sector index may be the remainder after dividing the Sector ID 128 for a cell/sector by N. If Sector_index=0, then Sector_index may be instead set as N. The operational parameter 136 (Op_val) for the cell/sector may then be selected from the sorted list 132 (sorted_vector) based on the sector index, e.g., Op_val=sorted_vector(Sector_index). In other words, the operational parameter 136 may be selected from the sorted list 132 at the sector index. The mod operation utilized in the operational parameter module 118 enables re-use of operational parameters 136 in case the number of cells/sectors in a cluster is larger than the provisioned list 124.

Once the BC 104/CU 103 has selected (self-assigned) its operational parameter(s) 136, it brings up the cell(s) and begins operation using the configured operational parameter(s) 136. For example, a cell startup module 138 may send the operational parameter(s) 136 to various RPs/RUs 106 and/or perform other registration functions. Furthermore, the operational parameters for the BC 104/CU 103 can be further periodically optimized with respect to the surrounding environment, e.g., using other techniques such as automatic neighbor relation (ANR).

Figure 3:
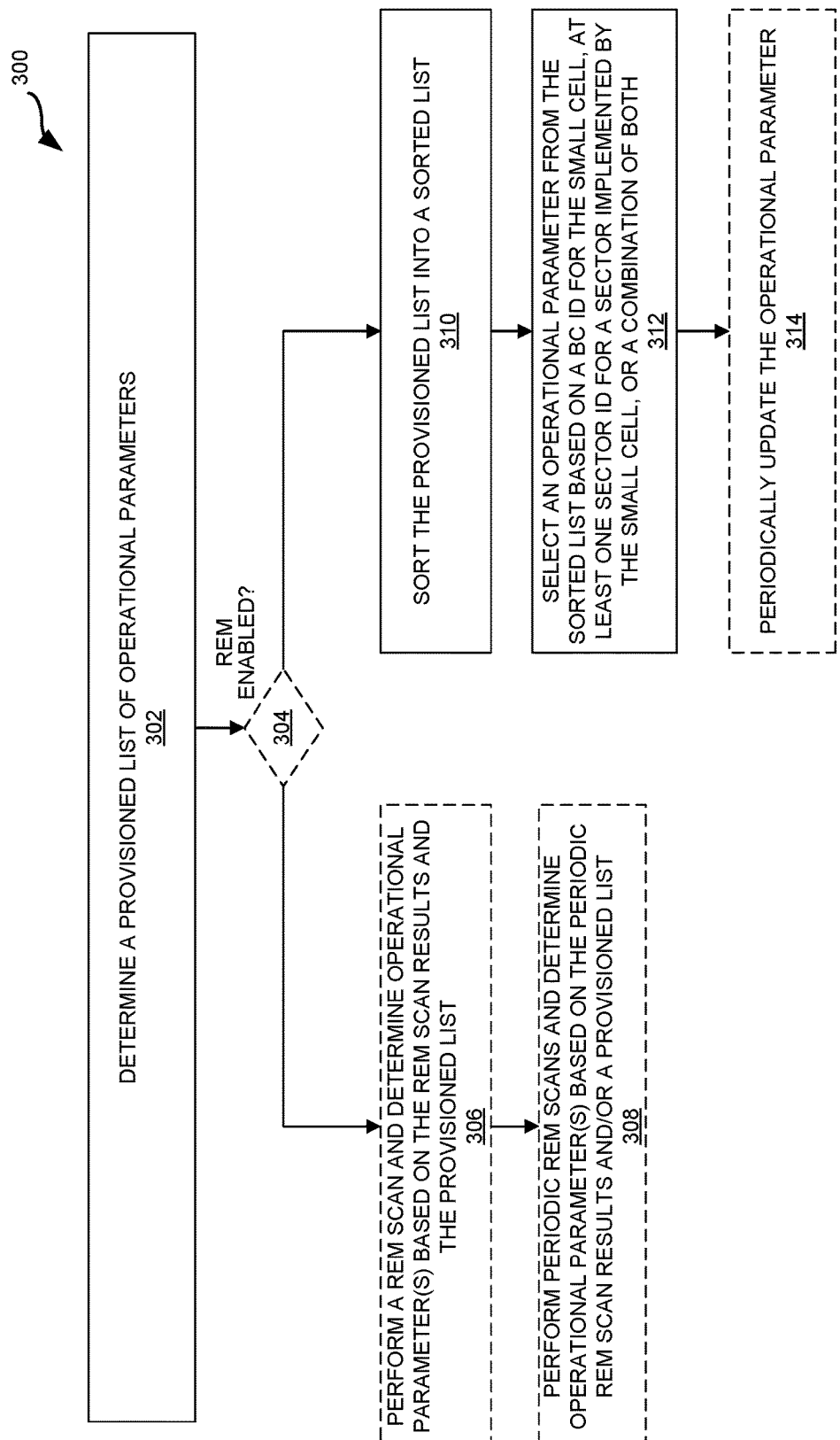
FIG. 3 is a flow diagram illustrating a method for automatic configuration of operational parameters in a small cell.

FIG. 3 is a flow diagram illustrating a method 300 for automatic configuration of operational parameters in a small cell 102. The method 300 may be performed by at least one processor in a small cell 102. If the small cell 102 is a C-RAN 102, the at least one processor performing the method 300 may be in the baseband controller 104 (in 4G) or DU 105 or CU 103 (in 5G). For example, the method 300 may be performed while the baseband controller 104 (in 4G) or CU 103 (in 5G) initializes at least one sector it implements.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

The method 300 begins at step 302 where the at least one processor determines a provisioned list 124 of operational parameters. The provisioned list 124 may be a vector (e.g., referred to as an input vector or configuration vector) where each element in the vector represents operational parameter values, e.g., PCIs or RSIs. In some configurations, the provisioned list 124 may have N elements and may be the same for all small cells 102 in a cluster. In some configurations, the provisioned list 124 is received from a management system 114, e.g., HeMS, DMS, OAM system/network, etc. In other configurations, the at least one processor locally configures the provisioned list 124, e.g., where a remote management system 114 is not present and/or functioning The method 300 proceeds at optional step 304 where the at least one processor determines if Radio Environment Monitoring (REM) is enabled in the small cell 102. This can include (1) checking a flag stored at the BC 104, DU 105, or CU 103; and/or (2) querying an RP 106A-M or RU 106N-O about their capabilities.

The method 300 proceeds at optional step 306 where, if REM is enabled in the small cell 102, the at least one processor performs a REM scan and determines operational parameter(s) based on the REM scan results and the provisioned list 124. The REM scan includes the small cell 102 listening to the downlink RF transmissions from neighboring cells (e.g., neighboring small cells 102 or macro base stations 108) on one or more frequency channels and determining the operational parameters being used by the neighboring cells. After the REM scan, the small cell 102 can configure its operational parameter(s) by selecting from the provisioned list 124 so as to not interfere with the operational parameter(s) of its neighbors that it listened to during the REM scan. Avoiding interference can include avoiding direct and/or mod-X (e.g., mod-3) collisions with operational parameter(s) of neighbor cells.

The method 300 proceeds at optional step 308 where, if REM is enabled in the small cell 102, the at least one processor performs periodic REM scans and determines operational parameter(s) based on the periodic REM scan results, a provisioned list 124, and/or periodic updates (e.g., similar to optional step 314 below). For example, PCI values and Root Sequence Indicator (RSI) values could be selected using REM scan results and could optionally be further optimized using optional step 314.

The method 300 proceeds at step 310 where, if REM is not enabled in the small cell 102, the at least one processor sorts the provisioned list 124 into a sorted list 132 of operational parameters. The sorting may utilize pre-determined sorting rule(s) stored at the small cell 102, e.g., in the BC 104/CU 103 of the small cell 102. Alternatively, instead of receiving the provisioned list 124 and sorting it at the small cell 102, the small cell 102 may receive the sorted list 132 directly from the management system 114.

In some configurations, the choice of sorting methodology for step 310 depends on the type of operational parameter (in the provisioned list 124) being selected. Depending on the LTE transmission format (resource allocation of these parameters in frequency or time) of the operational parameter, an appropriate sorting methodology is determined (to avoid collision/interference in the frequency or time domain) with co-channel neighboring cells/sectors.

When the operational parameter is an RSI, the sorting in step 310 can be straightforward based on length of the provisioned list 124 and Sector ID 128, e.g., sector ID 128 serves as index to the RSI value to be used in the provisioned list 124. For example if the provisioned list 124 is [1 2 3 4 5 6 7 8] and there are two small cells 102, each with two sectors, then the first small cell 102 will take 1 and 2 values for its two sectors, while a second small cell 102 takes 3 and 4 for its two sectors. In other cases, n RSIs need to be provisioned to each sector of a small cell (where n is known). In such cases, the RSI values can be sifted based on the sector ID, e.g., if n=2, then the first small cell 102 will take 1 and 2 for its first sector, and 3 and 4 for its second sector.

When the operational parameter is a transmission opportunity (e.g., for SRS, etc.), the sorting in step 310 can ensure that transmission opportunities for neighboring small cells 102 are orthogonal in time and/or frequency. For example, the BC ID could be used as an offset value so that transmission opportunities (e.g., for SRS, etc.) for neighboring small cells in a cluster do not overlap in time and/or frequency and, therefore, do not interfere with each other.

When the operational parameter is a PCI value, the sorting in step 310 may utilize a mod-X values of the elements in the provisioned list 124. For example, the operational parameters in the provisioned list 124 may be sorted using a predetermined pattern (that includes modulo X remainders (e.g., 0, 1, 2, ... X−1) of a predetermined integer X arranged in a particular order) such that the mod-X values of the elements in the sorted list 132 also appear in the same order as in the predetermined pattern. Accordingly, PCI selection seeks to choose the predetermined pattern such that no two elements (in the sorted list 132) repeat at the same index given any two patterns. In this way, interference is avoided between sectors using same frequency. In some cases, the patterns can be collapsed into a single pattern of length X. In case of a single pattern, adjacent elements of the sorted list 132 may have different mod-X values. However, this is not always the case. Below are examples configurations elucidating these points.

In a first example configuration where X=3 (e.g., mod-3 values are used to sort the provisioned list 124) and each small cell 102 in a cluster implements a single sector, we have three patterns: 0; 1; and 2 (where the pattern length is 1). Here, adjacent elements in the sorted list 132 would have different mod-X (mod-3 in this case) values because the patterns differ at every index (the 0th index).

In a second example configuration where X=3 (e.g., mod-3 values are used to sort the provisioned list 124) and each small cell 102 in a cluster implements two sectors, we have three patterns: 0 1; 2 0; 1 2 (where the pattern length is 2). Here, given any two patterns, no two elements are the same at the 0th and 1st index.

In a third example configuration where X=5 (e.g., mod-5 values are used to sort the provisioned list 124) and each small cell 102 in a cluster implements three sectors, the patterns can be: 0 1 2; 3 4 0; 1 2 3; 4 0 1; 2 3 4 (where the pattern length is 3). Here given any two patterns, we do not see repetition at 0th, 1st or 2nd index. Thus a first small cell 102 has PCI elements with mod-5 values of 0 1 2, the second small cell 102 (in the same cluster) has PCI elements with mod-5 values of 3 4 0, and so on. Thus if the small cells 102 implement three sectors on frequencies f1, f2, and f3, respectively, they would not interfere.

For the above example configurations, the patterns can also be collapsed into to a single pattern, e.g., 0 1 2 of length X=3 (in the first two example configurations) and [0 1 2 3] of length X=4, in the third example configuration (which corresponds to the FIG. 5 below). The use of single pattern is possible when the greatest common factor/divisor (GCF) of X and the number of sectors implemented by each small cell 102 is "1", e.g., when GCF(X, num_sectors)=1. For example, when X=3, GCF(3,1) and GCF(3,2)=1, so a single pattern would be sufficient. Another example is GCF(4,3) for mod-4 and each small cell 102 implementing three sectors.

Additionally, if the patterns from the third example configuration are expanded into a string of values (e.g., [0 1 2 3 4 0 1 2 3 4 0 1 2 3 4]), adjacent elements in the sorted list 132 would still have different mod-X values. However this adjacency property is not required for PCI selection. Rather, PCI sorting is performed so that no two elements in any two patterns collide at the same index. For example, the patterns could also be arranged as 0 1 2; 2 3 4; 3 4 0; 1 2 3; 4 0 1. If the patterns were expanded into a string of values, it would be: [0 1 2 2 3 4 3 4 0 1 2 3 4 0 1]. In this case, adjacency is not maintained but it does not matter. Also, in this case, the patterns could not be collapsed into a single pattern.

In a third example configuration where X=4 (e.g., mod-4 values are used to sort the provisioned list 124) and each small cell 102 in a cluster implements two sectors, the patterns can be: 0 1; 1 2; 2 3; 3 0 (where the pattern length is 2). The patterns cannot be collapsed into a single pattern. We cannot achieve single pattern of 0 1 2 3 since collisions occur in the first and third pattern using patterns 0 1; 2 3; 0 1; 2 3. Also we can verify here that GCF(X, num_sectors) is not 1.

It should be noted that if optional step 304 is not performed, the method 300 may proceed from step 302 directly to step 310. In other words, the small cell 102 may sort the provisioned list 124 without determining whether REM is enabled in some configurations.

The method 300 proceeds at step 312 where, if REM is not enabled in the small cell 102, the at least one processor selects an operational parameter 136 from the sorted list 132 based on a BC ID 122, a Sector ID 128 for a sector implemented by the small cell 102, or a combination of both. In other words, A BC ID 122 and/or a Sector ID 128 can be used to assign optimal operational parameters to the small cells 102 (in a cluster of small cells 102) so that the operational parameters selected reduce (or at least don't increase) interference between the small cells 102.

In some configurations, the BCs 104/CUs 103 (in the small cell 102) may determine a Sector ID 128 for each sector it implements. BC IDs 122 for the BC 104/CU 103 in the cluster are configured in an arithmetic progression, the increment or difference defined by the maximum number of sectors any BC 104/CU 103 in the cluster can support, e.g., defined by the management system 114. For example, if a BC 104/CU 103 implements two sectors, then the Sector ID 128 for sector 1 is the same as the BC ID 122 (e.g., received from the management system 114), and the Sector ID 128 for sector 2 is BC ID+1. In some examples, the at least one processor selects an operational parameter 136 at an index (in the sorted list 132) that is based on (e.g., equal to) the Sector ID 128, where the Sector ID 128 was derived based on the BC ID 122 received from the management system 114.

In some configurations, step 312 includes selecting an operational parameter 136 in a different color group (CG) than the operational parameter(s) of neighboring cell(s). A color group (CG) index may be computed as mod (BC ID 122, X*num_sectors) for any given small cell 102, where num_sectors is the number of sectors implemented by the small cell and X is a predetermined integer. In other words, the CG of a small cell 102 may be the remainder after dividing the BC ID 122 by (X times the number of sectors implemented by the small cell 102). Thus, it can be ensured that a maximum of X co-channel BCs 104/CUs 103 can have a unique color group index (CG). If possible, the BC IDs 122 are chosen (e.g., by an operator at the management system 114) such that two BCs 104/CUs 103 with the same color group index (CG) have maximum geographic distance between each other.

The method 300 proceeds at optional step 314 where, if REM is not enabled in the small cell 102, the at least one processor periodically updates the operational parameter 136. The operational parameter 136 may be continuously optimized, if necessary, during periodic ANR (automatic neighbor relation) performed in the small cell 102, e.g., BC 104/CU 103. ANR functionality in a small cell 102 is a procedure where the small cell 102 maintains a Neighbor Relation Table (NRT) containing the neighbor small cell's identifiers and operational parameters such as PCI, RSI, ECGI, EARFCN, etc. These parameters can be updated periodically via different means such as X2, UE ANR, OAM, handovers and is implementation-specific. ANR via UE is a procedure where the small cell 102 updates its Neighbor Relation Table (NRT) via UE reports. A small cell 102 instructs the UEs to perform measurements on newly detected neighbors and report the neighbor small cell's identifiers and signal strength.

Sector ID Determination

Figure 4:
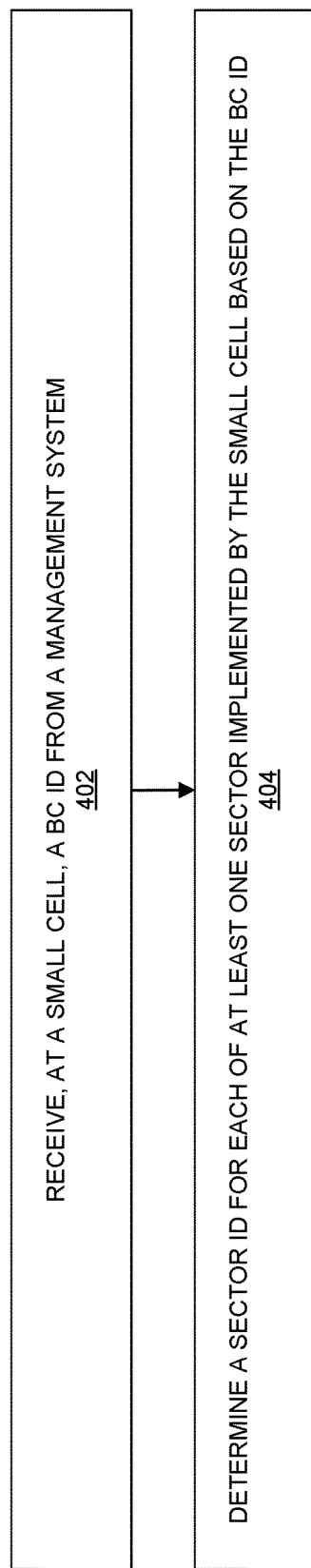
FIG. 4 is a flow diagram illustrating a method for determining a Sector ID for at least one sector implemented by a small cell.

FIG. 4 is a flow diagram illustrating a method 400 for determining a Sector ID 128 for at least one sector implemented by a small cell 102. The method 400 may be performed by at least one processor in a small cell 102. If the small cell 102 is a C-RAN 102, the at least one processor performing the method 400 may be in the baseband controller 104 (in 4G) or DU 105 or CU 103 (in 5G). The small cell 102 would generally include a single baseband controller 104 (in 4G) or CU 103 (in 5G), although other configurations are possible. Furthermore, it is assumed that the small cell 102 implementing the method 400 is one of multiple small cells 102 in a cluster of small cells 102, each small cell implementing at least one sector or cell. The small cell 102 may implement any number of cells (or sectors), e.g., 1, 2, 3, etc.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

The method 400 begins at step 402 where the at least one processor (in the small cell 102) receives a BC ID 122 from a management system 114. In order to avoid co-channel BCs 104 and/or CUs 103 from having colliding PCIs, the management system 114 may configure BC IDs 122 for co-channel BCs 104 and/or CUs 103 in a cluster such that they have unique color group indices. In some examples, a color group (CG) index is computed as mod (BC ID 122, 3*num_sectors) for any given BC 104/CU 103. Thus, it can be ensured that a maximum of 3 co-channel BCs can have a unique CG index. If possible, BC IDs 122 are chosen such that two BCs 104 or CUs 103 with the same color index have the maximum geographic distance between each other.

The method 400 proceeds at step 404 where the at least one processor determines a Sector ID 128 for each of at least one sector implemented by the small cell 102 based on the BC ID 122. For example, each BC 104 or CU 103 may determine a Sector ID 128 for its sector(s) based on its BC ID 122, e.g., that was received from the management system 114. BC IDs 122 for the BCs 104 or CUs 103 in the cluster can be configured in an arithmetic progression, the increment or difference defined by the maximum number of sectors any BC 104 or CU 103 in the cluster can support. For example, if the small cells 102 in a cluster each implement two sectors, then the Sector IDs 128 for sector 1 and sector 2 are BC ID 122 and BC ID+1, respectively.

Single-Sector and Two-Sector PCI Selection Scenario

Although there are many different types of operational parameters, such as physical cell identifier (PCI), root sequence index (RSI), and/or tracking area code (TAC), various PCI-specific selection is described below. In each of the following scenarios, it is assumed that a small cell 102, in a cluster of small cells 102, is configuring its PCI without using REM, e.g., the small cell 102 is configuring its initial PCI assignment needed to initialize the cell, which can be optimized later based on ANR. If the small cell 102 is a C-RAN 102, the small cell 102 would generally include a single baseband controller 104 (in 4G) or CU 103 (in 5G), although other configurations are possible.

Figure 5:
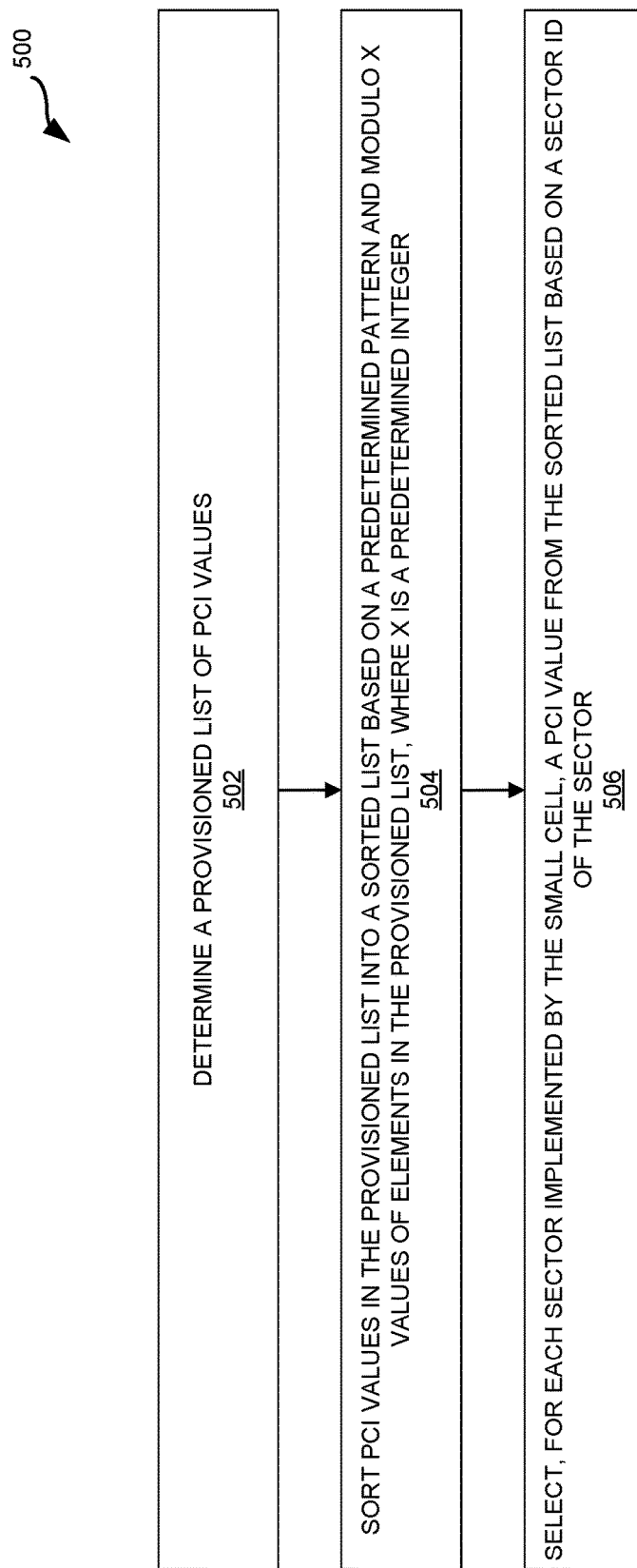
FIG. 5 is a flow diagram illustrating a method for PCI selection in a small cell implementing a single sector.

FIG. 5 is a flow diagram illustrating a method 500 for PCI selection in a small cell 102 implementing one or two sectors. The method 500 may be performed by at least one processor in the small cell 102, e.g., in the baseband controller 104 (in 4G) or CU 103 (in 5G) if the small cell 102 is implemented using a C-RAN 102. For example, the method 500 may be performed while the baseband controller 104 (in 4G) or CU 103 (in 5G) initializes at least one sector it implements.

The blocks of the flow diagram shown in FIG. 5 have been arranged in a generally sequential manner for ease of explanation; however, it is to be understood that this arrangement is merely exemplary, and it should be recognized that the processing associated with method 500 (and the blocks shown in FIG. 5) can occur in a different order (for example, where at least some of the processing associated with the blocks is performed in parallel and/or in an event-driven manner). Also, most standard exception handling is not described for ease of explanation; however, it is to be understood that method 500 can and typically would include such exception handling.

In a single-sector scenario, assume that each small cell 102 in the cluster implements one sector operating on frequency f1. When each small cell 102 implements a single sector, the BC ID 122 assigned to each small cell 102 is also the Sector ID 128 of the sector implemented by the small cell 102.

In a two-sector scenario, assume that each small cell 102 in the cluster implements two sectors operating on different frequencies: f1 and f2. When a small cell 102 implements two sectors, the first sector's Sector ID 128 is equal to the BC ID 122 assigned to the small cell 102, while the second sector's Sector ID 128 is equal to the BC ID+1.

The method 500 begins at step 502 where the at least one processor determines a provisioned list (P) 124 (of length N), where each element in the provisioned list (P) 124 is a PCI value (with no repeated values in the provisioned list 124). In some configurations, the management system 114 may have a separate list of PCI values for the macro base station(s) 108 in the area that does not overlap with the provisioned list 124 sent to the small cells 102 in the cluster. In some configurations, the at least one processor receives the provisioned list (P) 124 from a management system 114. In other configurations, the at least one processor locally configures the provisioned list (P) 124, e.g., where a remote management system 114 is not present and/or functioning The method 500 proceeds at step 504 where the at least one processor sorts PCI values in the provisioned list (P) 124 into a sorted list 132 based on a predetermined pattern and the mod-X values (remainders when divided by a predetermined integer X) of the elements in the provisioned list (P) 124. In other words, the PCI values in the provisioned list (P) 124 are sorted using a predetermined pattern (that includes modulo X remainders (e.g., 0, 1, 2, . . . X−1) of a predetermined integer X arranged in a particular order) such that the mod-X values of the elements in the sorted list 132 also appear in the same order as in the predetermined pattern. In some (but not all) configurations, adjacent PCI values in the sorted list 132 may have different mod-X (e.g., mod-3) values, i.e., adjacent PCI values in the sorted list 132 have different remainders when divided by a predetermined integer, such as 3. The at least one processor may accumulate the selected PCIs in a sorted list 132 (sorted_vector).

In mod-3 operation, the predetermined pattern can be: 1, 2, 0; 1, 0, 2; 0, 1, 2; 0, 2, 1; 2, 1, 0; or 2, 0, 1. For example, if the predefined pattern is 1, 2, 0, the at least one processor may, during the first selection round, select the first PCI value in the provisioned list (P) 124 with a mod-3 value of 1, then select the first PCI value in the provisioned list (P) 124 with a mod-3 value of 2, then select the first PCI value in the provisioned list (P) 124 with a mod-3 value of 0. After a PCI value from the provisioned list (P) 124 is selected and placed in the sorted list 132, it is no longer considered for selection during future selection rounds. If there is no PCI value in the provisioned list (P) 124 with a particular mod-X (e.g., mod-3) value, then the operation is skipped for that mod-X (e.g., mod-3) value during that round. In other words, less than three PCI values may be selected in a particular selection round, depending on the remaining PCI values in the provisioned list (P) 124. For example, if the provisioned list (P) 124 does not include a PCI with a mod-3 value of 0, the at least one processor may only select two PCI values from the provisioned list (P) 124 in a selection round: one with a mod-3 value of 1 and another with a mod-3 value of 2. The predetermined patterns may be chosen so that the mod-3 value of a PCI of a particular sector (e.g., first sector) of a small cell 102 is different from the corresponding sector (e.g., first sector) of another small cell 102

The at least one processor may perform successive selection rounds until all PCI values in the provisioned list (P) 124 have been selected. As mentioned above, once a PCI in the provisioned list (P) 124 is selected during a selection round, it is excluded from consideration during future selection rounds. It should be noted that, in the method 500 where the small cells 102 in a cluster each implement one or two sectors, the same pattern is used for each successive selection round. In contrast, as discussed below, a different predetermined pattern can be used in different selection rounds in scenarios where the small cells 102 in a cluster each implement three sectors.

It should be noted that the PCI values in the sorted list 132 may not have an equal distribution of mod-X (e.g., mod-3) values. As a non-limiting example, the mod-3 values of the PCI values in the sorted list 132 may be: mod-3(sorted_vector)=[1 2 0 1 2 0 1 2 0 2 0 2 0 2 0] where the mod-3(Y) operator determines the mod-3 values of the vector Y.

The method 500 proceeds at step 506 where the at least one processor selects, for each sector implemented by the small cell 102, a PCI value from the sorted list 132 based on a Sector ID 128 of the sector. For example, the at least one processor may determine an index (PCI_index) for each sector implemented by the small cell 102 based on the Sector ID 128 of the sector, e.g., each sector implemented by the baseband controller 104 (in 4G) or CU 103 (in 5G) if the small cell 102 is implemented using a C-RAN 102. For example, the index (PCI_index) may be determined as PCI_index=mod(BC Sector ID, N); where the index (PCI_index) is set to N (the length of the provisioned list 124) when mod(BC Sector ID, N)=0. The Sector ID 128 may be determined using a BC ID 122 received from a management system 114, e.g., as outlined in the method 400 of FIG. 4.

In some configurations the same PCI can be assigned to all the sectors of a small cell 102, e.g., where each small cell 102 in a cluster assigns the same PCI to each of its sectors, but the PCIs differ from small cell 102 to small cell 102 and are chosen according to a sorting scheme. For example, based on a flag (e.g., assignSamePCI), all the sectors of a small cell 102 can be required to use the same PCI. That is derive a Sector ID=ceil(BC ID/number of sectors) where ceil(Z) is a ceiling operator that produces the least integer greater than or equal to Z. In an example with 3 small cells 102 implementing 3 sectors each (with BC IDs=1, 4, 7), the sector IDs used by the small cells 102 are 1, 2, 3 for the small cells 102, respectively, and in turn used to derive the index (PCI_index).

Step 506 may also include the at least one processor selecting, for each sector, one of the PCI values from the sorted list 132 based on the respective index for the sector. For example, the at least one processor can select a PCI value for the sector at the index in the sorted list 132 equal to the Sector ID 128. Put another way, the selected PCI value (PCI_sel) can be selected as: PCI sel=PCI_new_vector (PCI_index), e.g., the mod-N value of a Sector ID (e.g., where a mod-N value of 0 is assigned as N instead) can be thought of as an index to select a PCI value from the sorted list 132.

It should be noted that the method 500 uses a single predetermined pattern, however, similar methods may utilize more than one predetermined pattern, as discussed below. When a single pattern is used (like the method 500 of FIG. 5), the length of the pattern is equal to X (where X is the number used in the mod-X operation during sorting) but not the number of sectors implemented by each small cell 102. In contrast, when multiple patterns are used, the length of the pattern is equal to num of sectors implemented by each small cell 102. For example, if X=3 and num_sectors=2, the pattern 0 1 2 could be chosen, after which the elements would be sorted in mod-3 fashion as 0 1 2 0 1 2 . . . This could alternatively be seen as a set of 3 unique patterns of 0 1; 2 0; 1 2 . . . A single pattern of 0 1 2 can be used because of the condition that GCF(3, 2)=1.

First Example

In a first example, a cluster of small cells 102 may be implemented using multiple C-RANs 102, relatively closely-spaced together. The cluster is implemented as: (1) 12 BCs 104 (and/or CUs 103), each implementing a single sector (each of the 12 sectors is assigned one of 12 unique PCIs in the provisioned list 124); or (2) 6 BCs 104 (and/or CUs 103), each implementing two sectors (each of the 12 sectors is assigned one 6 unique PCIs in the provisioned list 124). When the cluster is implemented with 12 single-sector BCs 104 (or CUs 103), the BC IDs 122 are from 1:12. When the cluster is implemented with 6 two-sector BCs 104 (or CUs 103), the BC IDs 122 are 1, 3, 5, 7, 9, 11.

Assume that the provisioned list (P) 124, received from the management system 114, is: P=[101 111 112 114 115 116 117 119 124 128 134 138]. Accordingly, each small cell 102 will select one of the 12 PCIs in this list. Before selection, the PCI values may be sorted (e.g., as described in step 504 above). If the 1, 2, 0 pattern is used, the sorted list 132 may be given as: PCI_new_vector=[112 101 111 115 116 114 124 119 117 128 138 134].

Next, an index for each sector may be determined, e.g., by the BC 104 or CU 103 implementing the sector as described above. For example, the index (PCI_index) may be determined as PCI_index=mod(BC Sector ID, N). In the first example (12 single-sector or 6 two-sector BCs 104/CUs 103) with a provisioned list 124 of length N=12, the indices for Sector ID=1:12 are: PCI_index=[1 2 3 4 5 6 7 8 9 10 11 12].

Lastly, a PCI is selected (from the sorted list 132) for each sector based on the respective index for the sector, e.g., as described above. In other words, each sector may be assigned a PCI (from the sorted list 132) based on the sector's PCI_index (1:12). The PCI for each sector can then be assigned as: PCI_sel (1:12)=[112 101 111 115 116 114 124 119 117 128 138 134]. Therefore, in the first example, the Sector ID can be thought of as an index to select a PCI from the sorted list 132, e.g., Sector ID 1 is assigned the first PCI in the sorted list 132; Sector ID 2 is assigned the second PCI in the sorted list 132; Sector ID 3 is assigned the third PCI in the sorted list 132; etc.

Figure 6:
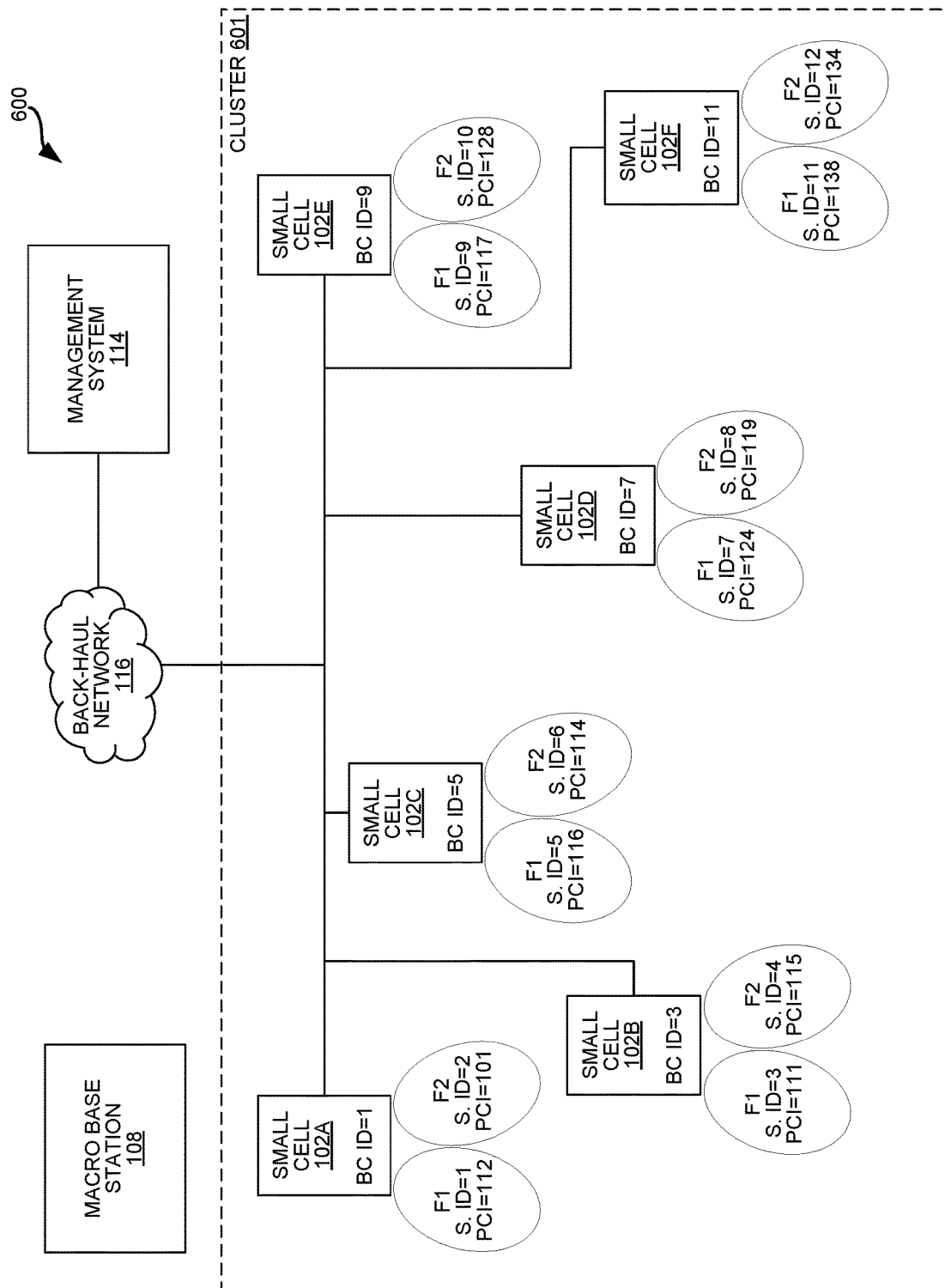
FIG. 6 is a block diagram illustrating a system according to the first example of selecting PCIs in a cluster of small cells, each small cell implementing two sectors.

FIG. 6 is a block diagram illustrating a system 600 according to the first example (described above) of selecting PCIs in a cluster 601 of small cells 102, each small cell 102 implementing two sectors. The system 600 is shown with six different small cells 102A-F, each implementing two sectors (on operating carrier frequencies f1 and f2, respectively). In some configurations, each of one or more of the small cells 102 is implemented using a C-RAN 102 with a BC 104 (if 4G) or a CU 103 (if 5G). The small cells 102 may be communicatively coupled to a management system 114 (via a back-haul network 116) and/or be near one or more macro base stations 108.

The sectors are illustrated as ovals in FIG. 6, however, it is understood that each individual sector could take any suitable shape or size (and may overlap with other sectors). In each sector (oval) is shown (1) the operating carrier frequency of the sector (f1 or f2); (2) the Sector ID 128 of the sector (abbreviated as "S. ID"); and (3) the PCI selected for the sector.

According to the first example, the management system 114 may send a provisioned list 124 to the small cells 102. The provisioned list 124 may include 12 unique PCIs that do not overlap with the PCIs provisioned for surrounding macro base station(s) 108. In other words, the management system 114 may have a separate list of PCIs for the macro base station(s) in the area that does not overlap with the provisioned list 124 sent to the small cells 102 in the cluster 601. The provisioned list 124 may be given as: P=[101 111 112 114 115 116 117 119 124 128 134 138].

A BC ID 122 is also supplied (e.g., from the management system 114) to each small cell 102 during start-up or commissioning. The BC IDs 122 for the small cells 102 are 1, 3, 5, 7, 9, 11. It should be noted that the small cell 102A with BCID=1 and the small cell 102D with BC ID=7 are located geographically far apart since they have the same color group: CG=mod(7,6)=mod(1,6). Similarly, the small cell 102B with BCID=3 and the small cell 102E with BC ID=9 are located geographically far apart since they have the same color group: CG=mod(3,6)=mod(9,6). Similarly, the small cell 102C with BCID=5 and the small cell 102F with BC ID=11 are located geographically far apart since they have the same color group: CG=mod(5,6)=mod(11,6).

Each small cell 102 may sort the received provisioned list 124 into a sorted list 132, e.g., according to step 504. For example, the sorted list 132 may be given as: PCI_new_vector=[112 101 111 115 116 114 124 119 117 128 138 134]. Each small cell 102 may then determine an index for each sector it implements and determine a PCI for each sector it implements based on the index, as shown in FIG. 6.

Second Example

In a second example, the cluster again includes small cells 102 implemented with C-RANs 102 in proximity to each other. The cluster is implemented as: (1) 12 BCs 104 (and/or CUs 103), each implementing a single sector (each of the 12 sectors is assigned one of 12 unique PCIs in the provisioned list 124); or (2) 6 BCs 104 (and/or CUs 103), each implementing two sectors (each of the 12 sectors is assigned one 6 unique PCIs in the provisioned list 124). When the cluster is implemented with 12 single-sector BCs 104 (or CUs 103), the BC IDs 122 are from 1:12. When the cluster is implemented with 6 two-sector BCs 104 (or CUs 103), the BC IDs 122 are 1, 3, 5, 7, 9, 11.

However, the second example differs from the first example because the provisioned list (P) 124 only includes six PCIs (not 12 as in the first example). Therefore, in the second example, there are 12 sectors implemented across the cluster and only six unique PCIs to be assigned. Accordingly, the PCIs are reused across different sectors in the cluster due to the limited number of PCIs available. Assume that the provisioned list (P) 124, received from the management system 114, is: P=[101 111 112 114 115 116].

Before selection, the PCI values may be sorted (e.g., as described in step 504 above). If the 1, 2, 0 pattern is used, the sorted list 132 may be given as: PCI_new_vector=[112 101 111 115 116 114].

Next, an index for each sector may be determined, e.g., by the BC 104 or CU 103 implementing the sector, as described above. For example, the index (PCI_index) may be determined as PCI_index=mod(BC Sector ID, N), e.g., where a value of 0 is assigned as N instead. In the second example (12 single-sector or 6 two-sector BCs 104/CUs 103) with a provisioned list 124 of length N=6, the indices for Sector ID=1:12 are: PCI_index=[1 2 3 4 5 6 1 2 3 4 5 6].

Lastly, a PCI is selected (from the sorted list 132) for each sector based on the respective index for the sector, e.g., as described in step 506 above. In other words, each sector may be assigned a PCI (from the sorted list 132) based on the sector's PCI_index (1:12). The PCI for each sector can then be assigned as: PCI_sel (1:12)=[112 101 111 115 116 114 112 101 111 115 116 114]. Therefore, in the second example, the mod-6 value of a Sector ID (e.g., where a mod-6 value of 0 is assigned as 6 instead) can be thought of as an index to select a PCI from the sorted list 132, e.g., Sector ID 1 is assigned the first PCI in the sorted list 132; Sector ID 2 is assigned the second PCI in the sorted list 132; . . . Sector ID 7 is assigned the first PCI in the sorted list 132; Sector ID 8 is assigned the second PCI in the sorted list 132; etc.

Third Example

In a third example, the cluster again includes small cells 102 implemented with C-RANs 102 in proximity to each other. The cluster is implemented as: (1) 12 BCs 104 (and/or CUs 103), each implementing a single sector (each of the 12 sectors is assigned one of 12 unique PCIs in the provisioned list 124); or (2) 6 BCs 104 (and/or CUs 103), each implementing two sectors (each of the 12 sectors is assigned one 6 unique PCIs in the provisioned list 124). When the cluster is implemented with 12 single-sector BCs 104 (or CUs 103), the BC IDs 122 are from 1:12. When the cluster is implemented with 6 two-sector BCs 104 (or CUs 103), the BC IDs 122 are 1, 3, 5, 7, 9, 11.

However, in the third example, the provisioned list (P) 124 only includes five PCIs (not 6 or 12 as in the first and second examples, respectively). Therefore, in the third example, there are 12 sectors implemented across the cluster and only five unique PCIs to be assigned. Accordingly, the PCIs are reused across different sectors in the cluster due to the limited number of PCIs available, and some PCIs are even used three times. Assume that the provisioned list (P) 124, received from the management system 114, is: P=[101 111 112 114 115]. Before selection, the PCI values may be sorted (e.g., as described in step 504 above). If the 1, 2, 0 pattern is used, the sorted list 132 may be given as: PCI_new_vector=[112 101 111 115 114].

Next, an index for each sector may be determined, e.g., by the BC 104 or CU 103 implementing the sector as described above. For example, the index (PCI_index) may be determined as PCI_index=mod(BC Sector ID, N), e.g., where a value of 0 is assigned as N instead. In the third example (12 single-sector or 6 two-sector BCs 104/CUs 103) with a provisioned list 124 of length N=5, the indices for Sector ID=1:12 are: PCI_index=[1 2 3 4 5 1 2 3 4 5 1 2].

Lastly, a PCI is selected (from the sorted list 132) for each sector based on the respective index for the sector, e.g., as described in step 506 above. In other words, each sector may be assigned a PCI (from the sorted list 132) based on the sector's PCI_index (1:12). The PCI for each sector can then be assigned as: PCI_sel (1:12)=[112 101 111 115 114 112 101 111 115 114 112 101]. Therefore, in the third example, the mod-5 value of a Sector ID (e.g., where a mod-5 value of 0 is assigned as 5 instead) can be thought of as an index to select a PCI from the sorted list 132, e.g., Sector ID 1 is assigned the first PCI in the sorted list 132; Sector ID 2 is assigned the second PCI in the sorted list 132; . . . Sector ID 6 is assigned the first PCI in the sorted list 132; Sector ID 8 is assigned the second PCI in the sorted list 132; . . . Sector ID 11 is assigned the first PCI in the sorted list 132; etc.

Three-Sector Scenario

Figure 7:
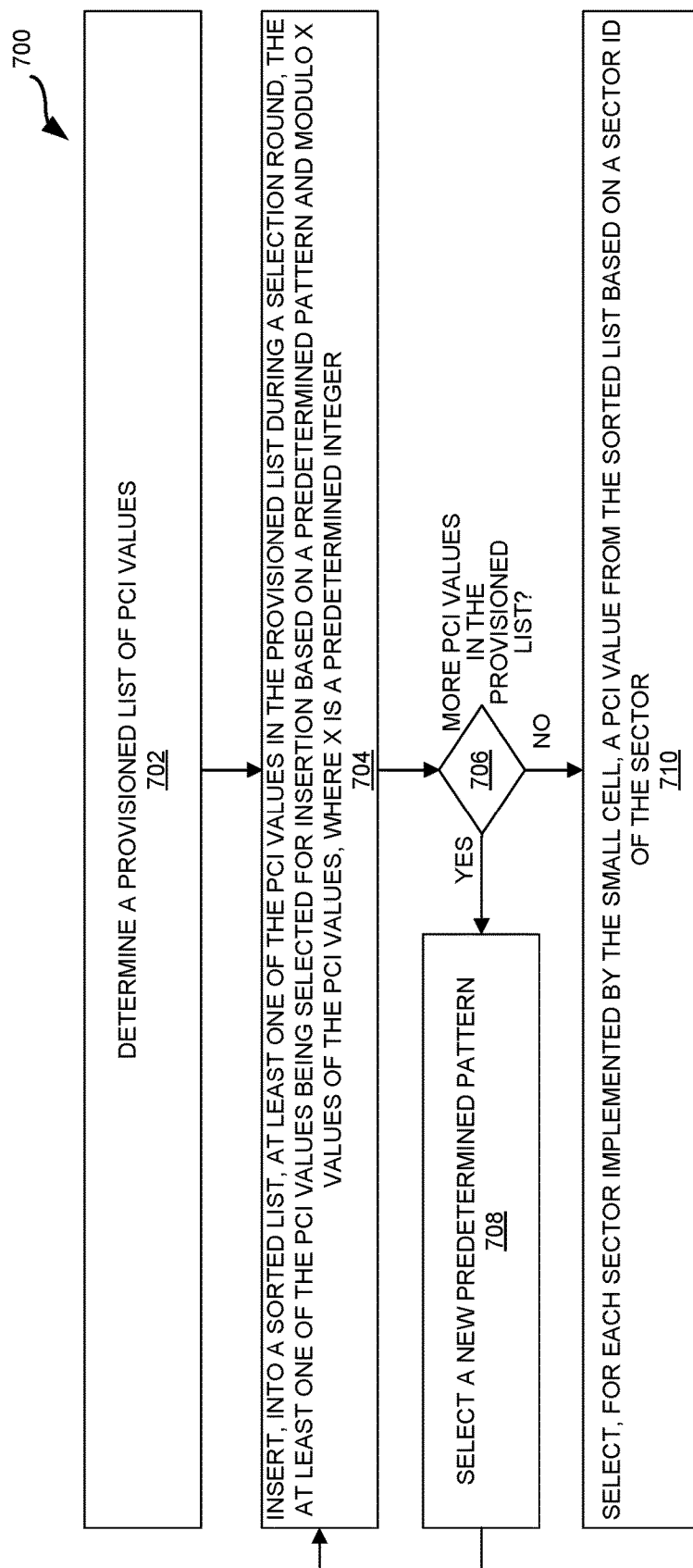
FIG. 7 is a flow diagram illustrating a method for PCI selection in a small cell implementing any number of sectors.

FIG. 7 is a flow diagram illustrating a method 700 for PCI selection in a small cell 102 implementing any number of sectors (e.g., three sectors). The method 700 may be performed by at least one processor in the small cell 102 configuring its PCI without using REM, e.g., in the baseband controller 104 (in 4G) or CU 103 (in 5G) if the small cell 102 is implemented using a C-RAN 102. For example, the method 700 may be performed while the baseband controller 104 (in 4G) or CU 103 (in 5G) initializes at least one sector it implements. If the small cell 102 is a C-RAN 102, the small cell 102 would generally include a single baseband controller 104 (in 4G) or CU 103 (in 5G), although other configurations are possible.

The blocks of the flow diagram shown in FIG. 7 have been arranged in a generally sequential manner for ease of explanation; however, it is to be understood that this arrangement is merely exemplary, and it should be recognized that the processing associated with method 700 (and the blocks shown in FIG. 7) can occur in a different order (for example, where at least some of the processing associated with the blocks is performed in parallel and/or in an event-driven manner). Also, most standard exception handling is not described for ease of explanation; however, it is to be understood that method 700 can and typically would include such exception handling.

In a three-sector scenario, assume that each small cell 102 in the cluster implements three sectors operating on frequencies f1, f2, and f3. When a small cell 102 implements three sectors, the first sector's Sector ID 128 is equal to the BC ID 122 assigned to the small cell 102, the second sector's Sector ID 128 is equal to the BC ID+1, and the third sector's Sector ID 128 is equal to the BC ID+2.

The method 700 begins at step 702 where the at least one processor determines a provisioned (P) list 124 (of length N), where each element in the provisioned list (P) 124 is a PCI value (with no repeated values in the provisioned list 124). In some configurations, the management system 114 may have a separate list of PCI values for the macro base station(s) 108 in the area that does not overlap with the provisioned list 124 sent to the small cells 102 in the cluster. In some configurations, the at least one processor receives the provisioned list (P) 124 from a management system 114. In other configurations, the at least one processor locally configures the provisioned list (P) 124, e.g., where a remote management system 114 is not present and/or functioning The method 700 proceeds at step 704 where the at least one processor inserts, into a sorted list 132, at least one of the PCI value in the provisioned list (P) 124 during a selection round. The at least one PCI value is selected for insertion based on (1) a predetermined pattern; and (2) the modulo X (mod-X) values of elements in the provisioned list, where X is a predetermined integer. In other words, the at least one PCI value is selected for insertion using at least one predetermined pattern (each pattern including modulo X remainders (e.g., 0, 1, 2, . . . X–1) of a predetermined integer X arranged in a particular order) so that the mod-X values of the elements inserted during a particular selection round also appear in the same order as in the predetermined pattern used for the selection round. For example, the at least one processor may select up to three PCIs from the provisioned list (P) 124 according to a first predetermined pattern (of mod-X values) during a first selection round. The at least one processor may accumulate the selected PCI values in a sorted list 132 (sorted_vector). For example, the first predetermined pattern can be: 1, 2, 0; 1, 0, 2; 0, 1, 2; 0, 2, 1; 2, 1, 0; or 2, 0, 1.

For example, if the predefined pattern is 1, 2, 0, the at least one processor may, during the first selection round, select the first PCI value in the provisioned list (P) 124 with a mod-3 value of 1, then select the first PCI value in the provisioned list (P) 124 with a mod-3 value of 2, then select the first PCI value in the provisioned list (P) 124 with a mod-3 value of 0. After a PCI value from the provisioned list (P) 124 is selected and placed in the sorted list 132, it is no longer considered for selection during future selection rounds. If there is no PCI value in the provisioned list (P) 124 with a particular mod-X (e.g., mod-3) value, then the operation is skipped for that mod-X (e.g., mod-3) value during that round. Less than three PCI values may be selected in a particular selection round, depending on the remaining PCI values in the provisioned list (P) 124. For example, if the provisioned list (P) 124 does not include a PCI with a mod-X (e.g., mod-3) value of 0, the at least one processor may only select two PCI values from the provisioned list (P) 124 in a selection round: one with a mod-X (e.g., mod-3) value of 1 and another with a mod-X (e.g., mod-3) value of 2.

Following each successive selection round (each instance of step 704), the method 700 proceeds at step 706 where the at least one processor determines whether there are more PCI values in the provisioned list 124. In other words, the at least one processor checks whether any of the PCI values in the provisioned list 124 have not yet been selected (and placed in the sorted list 132). Put yet another way, when all the PCI values in the provisioned list 124 have not been inserted into the sorted list 132, the at least one processor may perform at least one additional selection round, one or more of the additional selection rounds being performed based on at least one different predetermined pattern.

If yes, the method 700 proceeds at step 708 where the at least one processor selects a new predetermined pattern, after which a new subset of PCI value(s) is selected during a new selection round (new instance of step 704). It should be noted that the "new" predetermined pattern in step 708 can be one that was previously be used, but generally not in the immediately preceding selection round.

In one configuration, the predetermined pattern used during the first selection round/iteration of step 704 is 1, 2, 0; the predetermined pattern used during the second selection round/iteration of step 704 (if performed) is 2, 0, 1; and the predetermined pattern used during the third selection round/iteration of step 704 (if performed) is 0, 1, 2. At each selection round, the selected PCI value(s) is/are accumulated in the sorted list (PCI_new_vector) and, if there is no PCI value with a particular mod-X (e.g., mod-3) value found in the predetermined pattern, then the mod-X (e.g., mod-3) value is skipped during that selection round.

Specifically, the predetermined patterns may be chosen so that the mod-3 value of a PCI of a particular sector (e.g., first sector) of a small cell 102 is different from the corresponding sector (e.g., first sector) of another small cell 102 (since a mod-3 collision occurs between any two sectors operating on the same frequency with PCIs whose mod-3 remainders are the same). For example, if the mod-3 value of three sectors of a first small cell 102 are 1, 2, 0 in this example, then the mod-3 values of the sectors of a second small cell 102 are 2 0 1. Thus, the mod-3 value of the first sector of the first small cell 102 (1) is different than the mod-3 value of the first sector of the second small cell 102 (2). Similarly, the mod-3 value of the second sector of the first small cell 102 (2) is different than the mod-3 value of the second sector of the second small cell 102 (0). Similarly, the mod-3 value of the third sector of the first small cell 102 (0) is different than the mod-3 value of the third sector of the second small cell 102 (1).

If the at least one processor determines that there are no PCI values in the provisioned list 124 (that have not been selected and placed in the sorted list 132) in step 706, the method 700 proceeds at step 710 where the at least one processor selects, for each sector implemented by the small cell, a PCI value from the sorted list 132 based on a Sector ID 128 of the sector. For example, the at least one processor may determine an index (PCI_index) for each sector implemented by the small cell 102 based on a Sector ID 128 of the sector, e.g., each sector implemented by the baseband controller 104 (in 4G) or CU 103 (in 5G) if the small cell 102 is implemented using a C-RAN 102. For example, the index (PCI_index) may be determined as PCI_index=mod(BC Sector ID, N); where the index (PCI_index) is set to N (the length of the provisioned list 124) when mod(BC Sector ID, N)=0. The Sector ID 128 may be determined using a BC ID 122 received from a management system 114, e.g., as outlined in the method 400 of FIG. 4.

Step 710 may also include the at least one processor selecting, for each sector, one of the PCI values from the sorted list 132 based on the respective index for the sector. For example, the at least one processor can select a PCI value for the sector at the index in the sorted list 132 equal to the Sector ID 128. Put another way, the selected PCI value (PCI_sel) can be selected as: PCI sel=PCI_new_vector (PCI_index), e.g., the mod-N value of a Sector ID (e.g., where a mod-N value of 0 is assigned as N instead) can be thought of as an index to select a PCI value from the sorted list 132.

Step 710 may be performed similarly to step 506. In some configurations, the Sector ID 128 may be determined using a BC ID 122 received from a management system 114, e.g., as outlined in the method 400 of FIG. 4.

It should be noted that, while the method 700 of FIG. 7 is described above for configurations in which each small cell 102 implements 3 sectors, the method 700 can be generalized for any number of sectors (e.g., each small cell 102 implements 1 or 2 sectors) and any mod-X operation. Generally, the length of the predetermined pattern is chosen to be equal to the number of sectors implemented by each small cell 102, and the number of patterns is equal to X, where X is the number used in the mod-X operation during sorting.

In an example where each small cell 102 implements a single sector, the length of each predetermined pattern is one element. For mod-3 operation, the number of patterns used is 3. Thus, the sequence of patterns used could be 1; 2; 0; which repeats itself. This may produce the same result as a 1 2 0 pattern that repeats itself, discussed above.

In an example where each small cell 102 implements two sectors, the length of each predetermined pattern is two elements. For mod-3 operation, the number of patterns used is 3. The sequence of patterns, for example, is 1, 2; 0, 1; 2, 0 which repeats itself. This may produce the same result as a 1 2 0 pattern that repeats itself, discussed above.

In an example where each small cell 102 implements three sectors, the length of each predetermined pattern is three elements. For mod-3 operation, the number of patterns used is 3. The sequence of patterns, for example, is 1, 2 0; 2, 0, 1; 0, 1, 2 which repeats itself.

In an example where each small cell 102 implements two sectors, the length of each predetermined pattern is two elements. For mod-4 operation, the number of patterns used is 4. The sequence of patterns, for example, is 0, 1; 2, 3; 1, 0; 3, 2 which repeats itself. Another set of patterns is 0, 1; 1, 2; 2, 3; 3, 0. Note that in this sequence adjacent elements have same mod-X. Thus, is it not necessarily required for adjacent elements in a sorted list 132 to have different mod-X values in all configurations, although it may be used in some configurations.

Fourth Example

In a fourth example, a cluster of small cells 102 includes multiple C-RANs 102, relatively closely spaced together. The cluster is implemented using four BCs 104 (and/or CUs 103), each implementing three sectors (each of the 12 sectors is assigned one of 12 unique PCIs in the provisioned list 124). The BC IDs 122 of the four BCs 104 (and/or CUs 103) are 1, 4, 7, and 10.

Assume that the provisioned list (P) 124, received from the management system 114, is: P=[101 111 112 114 115 116 117 119 124 128 134 138]. Before selection, the PCI values may be sorted into a sorted list 132, e.g., as described in steps 704-708 above. Assume that the predetermined pattern used during the first selection round/iteration of step 704 is 1, 2, 0; the predetermined pattern used during the second selection round/iteration of step 704 (if performed) is 2, 0, 1; the predetermined pattern used during the third selection round/iteration of step 704 (if performed) is 0, 1, 2; the predetermined pattern used during the fourth selection round/iteration of step 704 (if performed) is 1, 2, 0 again; the predetermined pattern used during the fifth selection round/iteration of step 704 (if performed) is 2, 0, 1; the predetermined pattern used during the sixth selection round/iteration of step 704 (if performed) is 0, 1, 2. In this configuration, the sorted list 132 may be given as: PCI_new_vector=[112 101 111 116 114 115 117 124 119 128 138 134].

Next, an index for each sector may be determined, e.g., by the BC 104 or CU 103 implementing the sector, as described above. For example, the index (PCI_index) may be determined as PCI_index=mod(BC Sector ID, N). In the fourth example (four three-sector BCs 104/CUs 103) with a provisioned list 124 of length N=12, the indices for Sector ID=1:12 are: PCI_index=[1 2 3 4 5 6 7 8 9 10 11 12].

Lastly, a PCI is selected (from the sorted list 132) for each sector based on the respective index for the sector, e.g., as described above. In other words, each sector may be assigned a PCI (from the sorted list 132) based on the sector's PCI_index (1:12). The PCI for each sector can then be assigned as: PCI_sel (1:12)=[112 101 111 116 114 115 117 124 119 128 138 134]. Therefore, in the fourth example, the Sector ID can be thought of as an index to select a PCI from the sorted list 132, e.g., Sector ID 1 is assigned the first PCI in the sorted list 132; Sector ID 2 is assigned the second PCI in the sorted list 132; Sector ID 3 is assigned the third PCI in the sorted list 132; etc.

Figure 8:
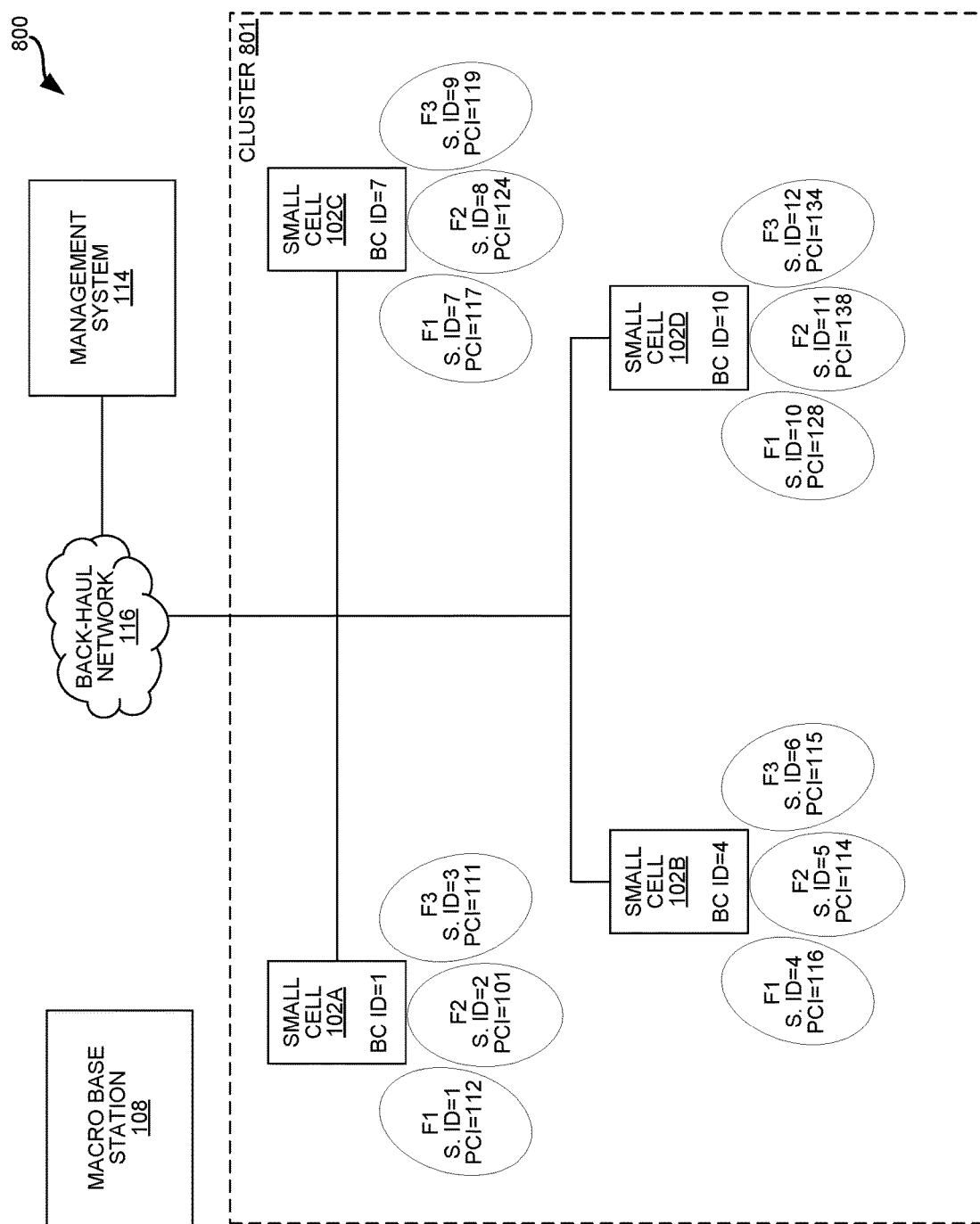
FIG. 8 is a block diagram illustrating a system according to the fifth example of selecting PCIs in a cluster of small cells, each small cell implementing three sectors.

FIG. 8 is a block diagram illustrating a system 800 according to the fourth example of selecting PCIs in a cluster 801 of small cells 102, each small cell 102 implementing three sectors. The system 800 is shown with four different small cells 102A-D, each implementing three sectors (on operating carrier frequencies f1, f2, and f3, respectively). In some configurations, each of one or more of the small cells 102 is implemented using a C-RAN 102 with a BC 104 (if 4G) or a CU 103 (if 5G). The small cells 102 may be communicatively coupled to a management system 114 (via a back-haul network 116) and/or be near one or more macro base stations 108.

The sectors are illustrated as ovals in FIG. 8, however, it is understood that each individual sector could take any suitable shape or size (and may overlap with other sectors). In each sector (oval) is shown (1) the operating carrier frequency of the sector (f1 or f2); (2) the Sector ID 128 of the sector (abbreviated as "S. ID"); and (3) the PCI selected for the sector.

The management system 114 may send a provisioned list 124 to the small cells 102. In the fourth example, the provisioned list 124 may include 12 unique PCIs that do not overlap with the PCIs provisioned for surrounding macro base station(s) 108. In other words, the management system 114 may have a separate list of PCIs for the macro base station(s) 108 in the area that does not overlap with the provisioned list 124 sent to the small cells 102 in the cluster 801. The provisioned list 124 may be given as: P=[101 111 112 114 115 116 117 119 124 128 134 138].

A BC ID 122 is also supplied (e.g., from the management system 114) during start-up or commissioning. The BC IDs 122 for the small cells 102 are 1, 4, 7, and 10.

Each small cell 102 may sort the received provisioned list 124 into a sorted list 132, e.g., according to steps 704-708. For example, the sorted list 132 may be given as: PCI_new_vector=[112 101 111 116 114 115 117 124 119 128 138 134]. Each small cell 102 may then determine an index for each sector it implements and determine a PCI for each sector it implements based on the index, as shown in FIG. 8.

Fifth Example

In a fifth example, the cluster again includes small cells 102 implemented with C-RANs 102 in proximity to each other. The cluster is implemented four BCs 104 (and/or CUs 103), each implementing three sectors (each of the 12 sectors is assigned one of 12 unique PCIs in the provisioned list 124). The BC IDs 122 of the four BCs 104 (and/or CUs 103) are 1, 4, 7, and 10.

However, the fifth example differs from the fourth example because the provisioned list (P) 124 only includes six PCIs (not 12 as in the fourth example). Therefore, in the fifth example, there are 12 sectors implemented across the cluster and only six unique PCIs to be assigned. Accordingly, the PCIs are reused across different sectors in the cluster due to the limited number of PCIs available. Assume that the provisioned list (P) 124, received from the management system 114, is: P=[101 111 112 114 115 116]. Before selection, the PCI values may be sorted (e.g., as described in step 704-708 above). Assume that the predetermined pattern used during the first selection round/iteration of step 704 is 1, 2, 0; the predetermined pattern used during the second selection round/iteration of step 704 (if performed) is 2, 0, 1; the predetermined pattern used during the third selection round/iteration of step 704 (if performed) is 0, 1, 2; etc. In this configuration, the sorted list 132 may be given as: PCI_new_vector=[112 101 111 116 114 115].

Next, an index for each sector may be determined, e.g., by the BC 104 or CU 103 implementing the sector, as described above. For example, the index (PCI_index) may be determined as PCI_index=mod(BC Sector ID, N), e.g., where a value of 0 is assigned as N instead. In the fifth example (four three-sector BCs 104/CUs 103) with a provisioned list 124 of length N=6, the indices for Sector ID=1:12 are: PCI_index=[1 2 3 4 5 6 1 2 3 4 5 6].

Lastly, a PCI is selected (from the sorted list 132) for each sector based on the respective index for the sector, e.g., as described above. In other words, each sector may be assigned a PCI (from the sorted list 132) based on the sector's PCI_index (1:12). The PCI for each sector can then be assigned as: PCI_sel (1:12)=[112 101 111 116 114 115 112 101 111 116 114 115]. Therefore, in the fifth example, the mod-6 value of a Sector ID (e.g., where a mod-6 value of 0 is assigned as 6 instead) can be thought of as an index to select a PCI from the sorted list 132, e.g., Sector ID 1 is assigned the first PCI in the sorted list 132; Sector ID 2 is assigned the second PCI in the sorted list 132; . . . Sector ID 7 is assigned the first PCI in the sorted list 132; Sector ID 8 is assigned the second PCI in the sorted list 132; etc.

Figure 9:
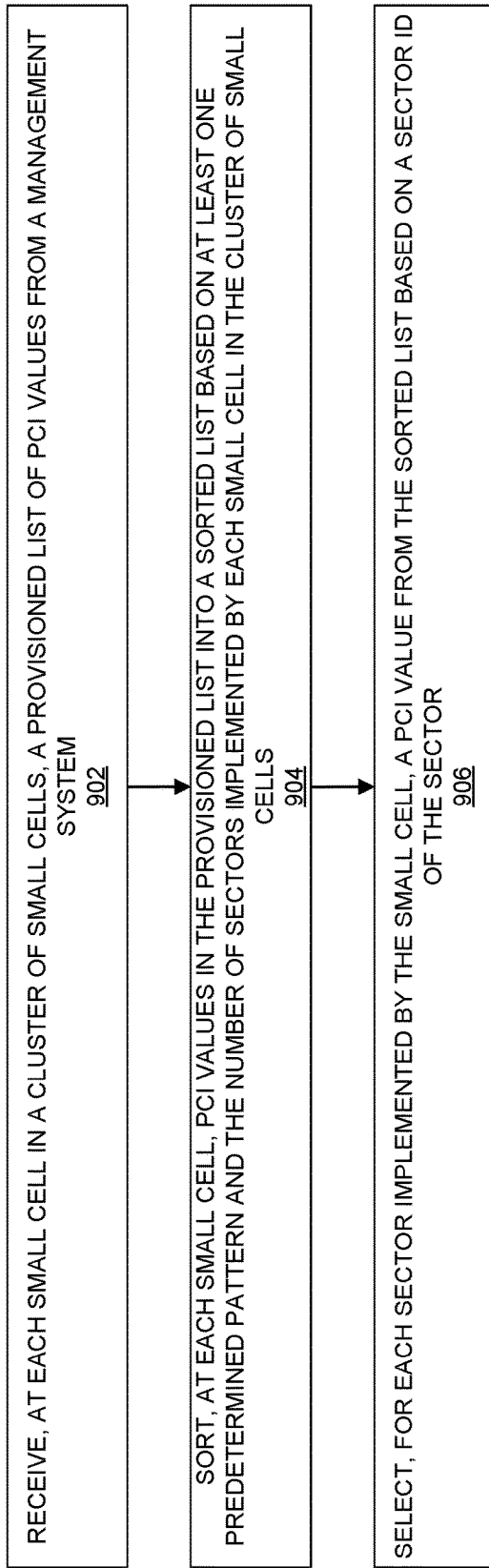
FIG. 9 is a flow diagram illustrating a method for selecting a PCI for a sector based on the number of sectors implemented by a small cell.

FIG. 9 is a flow diagram illustrating a method 900 for selecting a PCI for a sector based on the number of sectors implemented by a small cell 102. The method 900 may be performed by each small cell 102 in a cluster of small cells 102. If a particular small cell 102 is implemented using a C-RAN 102, the baseband controller 104 (in 4G) or CU 103 (in 5G) of the C-RAN 102 may be performing the method 900, e.g., using at least one processor. If a particular small cell 102 is a C-RAN 102, the C-RAN 102 would generally include a single baseband controller 104 (in 4G) or CU 103 (in 5G), although other configurations are possible.

The small cells 102 each perform the method 900 to configure their PCI without using REM. In some configurations, the method 900 may be performed while a baseband controller 104 (in 4G) or CU 103 (in 5G) in a C-RAN 102 initializes at least one sector it implements.

The blocks of the flow diagram shown in FIG. 9 have been arranged in a generally sequential manner for ease of explanation; however, it is to be understood that this arrangement is merely exemplary, and it should be recognized that the processing associated with method 900 (and the blocks shown in FIG. 9) can occur in a different order (for example, where at least some of the processing associated with the blocks is performed in parallel and/or in an event-driven manner). Also, most standard exception handling is not described for ease of explanation; however, it is to be understood that method 900 can and typically would include such exception handling.

Each of the small cells 102 in the cluster implements one or more sectors, e.g., 1, 2, 3, etc. Generally, all small cells 102 in a cluster implement the same number of sectors, though other configurations are possible. In a single-sector scenario, assume that each small cell 102 in the cluster implements one sector operating on frequency f1. When a small cell 102 implements a single sector, the BC ID 122 assigned to the small cell 102 is also the Sector ID 128 of the sector implemented by the small cell 102.

In a two-sector scenario, assume that each small cell 102 in the cluster implements two sectors operating on different frequencies: f1 and f2. When a small cell 102 implements two sectors, the first sector's Sector ID 128 is equal to the BC ID 122 assigned to the small cell 102, while the second sector's Sector ID 128 is equal to the BC ID+1.

In the three-sector scenario, assume that each small cell 102 in the cluster implements three sectors operating on frequencies f1, f2, and f3. When a small cell 102 implements three sectors, the first sector's Sector ID 128 is equal to the BC ID 122 assigned to the small cell 102, the second sector's Sector ID 128 is equal to the BC ID+1, and the third sector's Sector ID 128 is equal to the BC ID+2.

The method 900 begins at step 902 where each small cell 102, in a cluster of small cells 102, receives a provisioned (P) list 124 (of length N) from a management system 114. For example, each element in the provisioned list (P) 124 may be a PCI value, with no repeated values in the provisioned list 124. In some configurations, the management system 114 may have a separate list of PCI values for the macro base station(s) 108 in the area that does not overlap with the provisioned list 124 sent to the small cells 102 in the cluster.

The method 900 proceeds at step 904 where each small cell 102 sorts the PCI values in the provisioned list 124 into a sorted list 132 based on at least one predetermined pattern and the number of sectors implemented by each small cell in the cluster of small cells. For example, if the small cells 102 each implement one sector or two sectors with mod-3 operation, step 904 may proceed as described in step 504 (using the same predetermined pattern in every selection round). If, however, the small cells 102 each implement three sectors and/or a different mod-X operation (e.g., mod-4) is used, step 904 may proceed as described in steps 704-708 (using multiple predetermined patterns). For example, the predetermined integer may be 2, 3, 4, 5, etc.

The method 900 proceeds to step 906 where each small cell 102 selects, for each sector implemented by the small cell, a PCI value from the sorted list 132 based on a Sector ID 128 of the sector. For example, step 906 may proceed as described in step 506 or 710.

One or more predetermined patterns may be used when sorting the provisioned list 124. When a single pattern is used, the length of the pattern is equal to X (where X is the number used in the mod-X operation during sorting) but not the number of sectors implemented by each small cell 102. When multiple patterns are used, the length of the pattern is equal to num of sectors implemented by each small cell 102. Additionally, the at least one predetermined pattern used in step 904 (and the selection in step 906) may be chosen so that the mod-3 value of a PCI of a particular sector (e.g., first sector) of a small cell 102 is different from the corresponding sector (e.g., first sector) of another small cell 102 (since a mod-3 collision occurs between any two sectors operating on the same frequency with PCIs whose mod-3 remainders are the same).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms may refer to direct or indirect connections. If the specification states a component or feature "may," "can," "could," or "might" be included or have a characteristic, that particular component or feature is not required to be included or have the characteristic.

The terms "responsive" or "in response to" may indicate that an action is performed completely or partially in response to another action. The term "module" refers to a functional component implemented in software, hardware, or firmware (or any combination thereof) component.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

In conclusion, the present disclosure provides novel systems, methods, and arrangements for selecting a PCI in a small cell (or cluster of small cells) without using REM. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a small cell for selecting a physical cell identifier (PCI), comprising: at least one processor configured to: determine a provisioned list of PCI values; sort the PCI values in the provisioned list into a sorted list based on a predetermined pattern and modulo X values of elements in the provisioned list, where X is a predetermined integer; determine an index for each sector implemented by the small cell based on a sector ID for the sector; and select, for each sector implemented by the small cell, a PCI value from the sorted list based on a sector ID of the sector.

Example 2 includes the small cell of Example 1, wherein the modulo X value for a first sector implemented by the small cell is different than the modulo X value for a first sector implemented by a neighboring small cell.

Example 3 includes the small cell of any of Examples 1-2, wherein the predetermined pattern comprises modulo X remainders arranged in a particular order; wherein the sorting comprises inserting the PCI values from the provisioned list into the sorted list so that their modulo X values are in the same order as the modulo X remainders in the predetermined pattern.

Example 4 includes the small cell of any of Examples 1-3, wherein the small cell is implemented using a cloud radio access network (C-RAN), comprising: at least one radio point (RP), each being configured to exchange radio frequency (RF) signals with at least one user equipment (UE); and a baseband controller communicatively coupled to the at least one RP via a front-haul ETHERNET network.

Example 5 includes the small cell of Example 4, wherein the at least one processor is implemented in the baseband controller.

Example 6 includes the small cell of any of Examples 1-5, wherein the small cell is implemented using a cloud radio access network (C-RAN), comprising: a plurality of remote units (RUs), each being configured to exchange radio frequency (RF) signals with at least one user equipment (UE); and a centralized unit communicatively coupled to the plurality of RUs via a front-haul ETHERNET interface, wherein the centralized unit is a Distributed Unit (DU) or a Central Unit (CU) configured to operate in a 3GPP Fifth Generation communication system.

Example 7 includes the small cell of Example 6, wherein the at least one processor is implemented in the centralized unit.

Example 8 includes the small cell of any of Examples 1-7, wherein the predetermined pattern is: 1, 2, 0; 1, 0, 2; 2, 0, 1; 2, 1, 0; 0, 1, 2; or 0, 2, 1.

Example 9 includes the small cell of any of Examples 1-8, wherein the at least one processor is configured to sort the PCI values in the provisioned list by, during each of at least one iterative selection round, selecting up to three PCI values from the provisioned list (P) based on: remainders of the PCI values divided by the predetermined integer; and the predetermined pattern.

Example 10 includes the small cell of Example 9, wherein the predetermined pattern comprises three different integers: A, B, C; wherein selecting up to three PCI values comprises, in each selection round: selecting a first PCI value in the provisioned list, if any, with a remainder of A when divided by the predetermined integer; selecting a first PCI value in the provisioned list, if any, with a remainder of B when divided by the predetermined integer; and selecting a first PCI value in the provisioned list, if any, with a remainder of C when divided by the predetermined integer; wherein if a PCI value has been selected in a previous selection round, it is not considered for selection again.

Example 11 includes the small cell of any of Examples 1-10, wherein selecting, for each sector implemented by the small cell, a PCI value from the sorted list comprises: determining an index for each sector implemented by the small cell based on a sector ID for the sector; and for each sector, selecting one of the PCI values from the sorted list based on a respective index for the sector.

Example 12 includes a method for selecting a physical cell identifier (PCI) in a small cell, the method comprising: determining a provisioned list of PCI values; sorting the PCI values in the provisioned list into a sorted list based on a predetermined pattern and modulo X values of elements in the provisioned list, where X is a predetermined integer; and selecting, for each sector implemented by the small cell, a PCI value from the sorted list based on a sector ID of the sector.

Example 13 includes the method of Example 12, wherein the modulo X value for a first sector implemented by the small cell is different than the modulo X value for a first sector implemented by a neighboring small cell.

Example 14 includes the method of any of Examples 12-13, wherein the predetermined pattern comprises modulo X remainders arranged in a particular order; wherein the sorting comprises inserting the PCI values from the provisioned list into the sorted list so that their modulo X values are in the same order as the modulo X remainders in the predetermined pattern.

Example 15 includes the method of any of Examples 12-14, wherein the small cell is implemented using a cloud radio access network (C-RAN), comprising: at least one radio point (RP), each being configured to exchange radio frequency (RF) signals with at least one user equipment (UE); and a baseband controller communicatively coupled to the at least one RP via a front-haul ETHERNET network.

Example 16 includes the method of Example 15, wherein the method is implemented in the baseband controller.

Example 17 includes the method of any of Examples 12-16, wherein the small cell is implemented using a cloud radio access network (C-RAN), comprising: a plurality of remote units (RUs), each being configured to exchange radio frequency (RF) signals with at least one user equipment (UE); and a centralized unit communicatively coupled to the plurality of RUs via a front-haul ETHERNET interface, wherein the centralized unit is a Distributed Unit (DU) or a Central Unit (CU) configured to operate in a 3GPP Fifth Generation communication system.

Example 18 includes the method of Example 17, wherein the method is implemented in the centralized unit.

Example 19 includes the method of any of Examples 12-18, wherein the predetermined pattern is: 1, 2, 0; 1, 0, 2; 2, 0, 1; 2, 1, 0; 0, 1, 2; or 0, 2, 1.

Example 20 includes the method of any of Examples 12-19, wherein sorting the PCI values in the provisioned list by, during each of at least one iterative selection round, selecting up to three PCI values from the provisioned list (P) based on: remainders of the PCI values divided by the predetermined integer; and the predetermined pattern.

Example 21 includes the method of Example 20, wherein the predetermined pattern comprises three different integers: A, B, C; wherein selecting up to three PCI values comprises, in each selection round: selecting a first PCI value in the provisioned list, if any, with a remainder of A when divided by the predetermined integer; selecting a first PCI value in the provisioned list, if any, with a remainder of B when divided by the predetermined integer; and selecting a first PCI value in the provisioned list, if any, with a remainder of C when divided by the predetermined integer; wherein if a PCI value has been selected in a previous selection round, it is not considered for selection again.

Example 22 includes the method of any of Examples 12-21, wherein selecting, for each sector implemented by the small cell, a PCI value from the sorted list comprises: determining an index for each sector implemented by the small cell based on a sector ID for the sector; and for each sector, selecting one of the PCI values from the sorted list based on a respective index for the sector.

Example 23 includes a small cell for selecting a physical cell identifier (PCI), comprising: at least one processor configured to: determine a provisioned list of PCI values; insert, into a sorted list, at least one of the PCI values in the provisioned list during a first selection round, wherein the at least one of the PCI values is selected for insertion based on a predetermined pattern and modulo X values of elements in the provisioned list, where X is a predetermined integer; when all the PCI values in the provisioned list have not been inserted into the sorted list, perform at least one additional selection round, one or more of the additional selection rounds being performed based on at least one different predetermined pattern; and select, for each sector implemented by the small cell, a PCI value from the sorted list based on a sector ID of the sector.

Example 24 includes the small cell of Example 23, wherein the small cell is implemented using a cloud radio access network (C-RAN), comprising: at least one radio point (RP), each being configured to exchange radio frequency (RF) signals with at least one user equipment (UE); and a baseband controller communicatively coupled to the at least one RP via a front-haul ETHERNET network.

Example 25 includes the small cell of Example 24, wherein the at least one processor is implemented in the baseband controller.

Example 26 includes the small cell of any of Examples 23-25, wherein the small cell is implemented using a cloud radio access network (C-RAN), comprising: a plurality of remote units (RUs), each being configured to exchange radio frequency (RF) signals with at least one user equipment (UE); and a centralized unit communicatively coupled to the plurality of RUs via a front-haul ETHERNET interface, wherein the centralized unit is a Distributed Unit (DU) or a Central Unit (CU) configured to operate in a 3GPP Fifth Generation communication system.

Example 27 includes the small cell of Example 26, wherein the at least one processor is implemented in the centralized unit.

Example 28 includes the small cell of any of Examples 23-27, wherein a first predetermined pattern is used in the first selection round; a second predetermined pattern is used in a first additional selection round; and a third predetermined pattern is used in a second additional selection round.

Example 29 includes the small cell of any of Examples 23-28, wherein each predetermined pattern comprises modulo X remainders arranged in a particular order; wherein the PCI values are selected for insertion into the sorted list during each selection round so that their modulo X values are in the same order as the modulo X remainders in a respective predetermined pattern used during the respective selection round.

Example 30 includes the small cell of any of Examples 23-29, wherein a length of each predetermined pattern is equal to a number of sectors implemented by each of the small cell and a neighboring small cell in a cluster; wherein a number of different patterns used throughout all selection rounds is equal to the predetermined integer (X).

Example 31 includes the small cell of any of Examples 23-30, wherein the modulo X value for a first sector implemented by the small cell is different than the modulo X value for a first sector implemented by a neighboring small cell.

Example 32 includes the small cell of any of Examples 23-31, wherein the predetermined pattern comprises three different integers: A, B, C; wherein selecting at least one PCI value for insertion comprises, in each selection round: selecting a first PCI value in the provisioned list, if any, with a remainder of A when divided by the predetermined integer; selecting a first PCI value in the provisioned list, if any, with a remainder of B when divided by the predetermined integer; and selecting a first PCI value in the provisioned list, if any, with a remainder of C when divided by the predetermined integer; wherein if a PCI value has been selected in a previous selection round, it is not considered for selection again.

Example 33 includes the small cell of any of Examples 23-32, wherein selecting, for each sector implemented by the small cell, a PCI value from the sorted list comprises: determine an index for each sector implemented by the small cell based on a sector ID for the sector; and for each sector, select one of the PCI values from the sorted list based on a respective index for the sector.

Example 34 includes a method for selecting a physical cell identifier (PCI) in a small cell, the method comprising: determining a provisioned list of PCI values; inserting, into a sorted list, at least one of the PCI values in the provisioned list during a first selection round, wherein the at least one of the PCI values is selected for insertion based on a predetermined pattern and modulo X values of elements in the provisioned list, where X is a predetermined integer; when all the PCI values in the provisioned list have not been inserted into the sorted list, performing at least one additional selection round, one or more of the additional selection rounds being performed based on at least one different predetermined pattern; and selecting, for each sector implemented by the small cell, a PCI value from the sorted list based on a sector ID of the sector.

Example 35 includes the method of Example 34, wherein the small cell is implemented using a cloud radio access network (C-RAN), comprising: at least one radio point (RP), each being configured to exchange radio frequency (RF) signals with at least one user equipment (UE); and a baseband controller communicatively coupled to the at least one RP via a front-haul ETHERNET network.

Example 36 includes the method of any of Examples 35, wherein the method is implemented in the baseband controller.

Example 37 includes the method of any of Examples 34-36, wherein the small cell is implemented using a cloud radio access network (C-RAN), comprising: a plurality of remote units (RUs), each being configured to exchange radio frequency (RF) signals with at least one user equipment (UE); and a centralized unit communicatively coupled to the plurality of RUs via a front-haul ETHERNET interface, wherein the centralized unit is a Distributed Unit (DU) or a Central Unit (CU) configured to operate in a 3GPP Fifth Generation communication system.

Example 38 includes the method of Example 37, wherein the method is implemented in the centralized unit.

Example 39 includes the method of any of Examples 34-38, wherein a first predetermined pattern is used in the first selection round; a second predetermined pattern is used in a first additional selection round; and a third predetermined pattern is used in a second additional selection round.

Example 40 includes the method of any of Examples 34-39, wherein the small cell implements three sectors; wherein each predetermined pattern comprises modulo X remainders arranged in a particular order; wherein the PCI values are selected for insertion into the sorted list during each selection round so that their modulo X values are in the same order as the modulo X remainders in a respective predetermined pattern used during the respective selection round.

Example 41 includes the method of any of Examples 34-40, wherein a length of each predetermined pattern is equal to a number of sectors implemented by each of the small cell and a neighboring small cell in a cluster; wherein a number of different patterns used throughout all selection rounds is equal to the predetermined integer (X).

Example 42 includes the method of any of Examples 34-41, wherein the modulo X value for a first sector implemented by the small cell is different than the modulo X value for a first sector implemented by a neighboring small cell.

Example 43 includes the method of any of Examples 34-42, wherein the predetermined pattern comprises three different integers: A, B, C; wherein selecting at least one PCI value for insertion comprises, in each selection round: selecting a first PCI value in the provisioned list, if any, with a remainder of A when divided by the predetermined integer; selecting a first PCI value in the provisioned list, if any, with a remainder of B when divided by the predetermined integer; and selecting a first PCI value in the provisioned list, if any, with a remainder of C when divided by the predetermined integer; wherein if a PCI value has been selected in a previous selection round, it is not considered for selection again.

Example 44 includes the method of any of Examples 34-43, wherein selecting, for each sector implemented by the small cell, a PCI value from the sorted list comprises: determine an index for each sector implemented by the small cell based on a sector ID for the sector; and for each sector, select one of the PCI values from the sorted list based on a respective index for the sector.

The invention claimed is:

1. A small cell for selecting a physical cell identifier (PCI), comprising:
at least one processor configured to:
determine a provisioned list of PCI values;
sort the PCI values in the provisioned list into a sorted list based on a repeating predetermined pattern and modulo X values of elements in the provisioned list, where X is a predetermined integer; and
select, for each sector implemented by the small cell, a PCI value from the sorted list based on a sector ID of the sector.

2. The small cell of claim 1, wherein a modulo X value for a first sector implemented by the small cell is different than a modulo X value for a first sector implemented by a neighboring small cell.

3. The small cell of claim 1,
wherein the predetermined pattern comprises modulo X remainders arranged in a particular order;
wherein the sorting comprises inserting the PCI values from the provisioned list into the sorted list so that their modulo X values are in a same order as the modulo X remainders in the predetermined pattern.

4. The small cell of claim 1, wherein the small cell is implemented using a cloud radio access network (C-RAN), comprising:
at least one radio point (RP), each being configured to exchange radio frequency (RF) signals with at least one user equipment (UE); and
a baseband controller communicatively coupled to the at least one RP via a front-haul ETHERNET network.

5. The small cell of claim 4, wherein the at least one processor is implemented in the baseband controller.

6. The small cell of claim 1, wherein the small cell is implemented using a cloud radio access network (C-RAN), comprising:
a plurality of remote units (RUs), each being configured to exchange radio frequency (RF) signals with at least one user equipment (UE); and
a centralized unit communicatively coupled to the plurality of RUs via a front-haul ETHERNET interface, wherein the centralized unit is a Distributed Unit (DU) or a Central Unit (CU) configured to operate in a 3GPP Fifth Generation communication system.

7. The small cell of claim 6, wherein the at least one processor is implemented in the centralized unit.

8. The small cell of claim 1, wherein the predetermined pattern is:
1, 2, 0;
1, 0, 2;
2, 0, 1;
2, 1, 0;
0, 1, 2; or
0, 2, 1.

9. The small cell of claim 1, wherein the at least one processor is configured to sort the PCI values in the provisioned list by, during each of at least one iterative selection round, selecting up to three PCI values from the provisioned list (P) based on:
remainders of the PCI values divided by the predetermined integer; and
the predetermined pattern.

10. The small cell of claim 9, wherein the predetermined pattern comprises three different integers: A, B, C;
wherein selecting up to three PCI values comprises, in each selection round:
selecting a first PCI value in the provisioned list, if any, with a remainder of A when divided by the predetermined integer;
selecting a first PCI value in the provisioned list, if any, with a remainder of B when divided by the predetermined integer; and
selecting a first PCI value in the provisioned list, if any, with a remainder of C when divided by the predetermined integer;
wherein if a PCI value has been selected in a previous selection round, it is not considered for selection again.

11. The small cell of claim 1, wherein selecting, for each sector implemented by the small cell, a PCI value from the sorted list comprises:
determining an index for each sector implemented by the small cell based on a sector ID for the sector; and
for each sector, selecting one of the PCI values from the sorted list based on a respective index for the sector.

12. A method for selecting a physical cell identifier (PCI) in a small cell, the method comprising:
determining a provisioned list of PCI values;
sorting the PCI values in the provisioned list into a sorted list based on a repeating predetermined pattern and modulo X values of elements in the provisioned list, where X is a predetermined integer; and
selecting, for each sector implemented by the small cell, a PCI value from the sorted list based on a sector ID of the sector.

13. The method of claim 12, wherein a modulo X value for a first sector implemented by the small cell is different than a modulo X value for a first sector implemented by a neighboring small cell.

14. The method of claim 12,
wherein the predetermined pattern comprises modulo X remainders arranged in a particular order;
wherein the sorting comprises inserting the PCI values from the provisioned list into the sorted list so that their modulo X values are in a same order as the modulo X remainders in the predetermined pattern.

15. The method of claim 12, wherein the small cell is implemented using a cloud radio access network (C-RAN), comprising:
at least one radio point (RP), each being configured to exchange radio frequency (RF) signals with at least one user equipment (UE); and
a baseband controller communicatively coupled to the at least one RP via a front-haul ETHERNET network.

16. The method of claim 15, wherein the method is implemented in the baseband controller.

17. The method of claim 12, wherein the small cell is implemented using a cloud radio access network (C-RAN), comprising:
a plurality of remote units (RUs), each being configured to exchange radio frequency (RF) signals with at least one user equipment (UE); and
a centralized unit communicatively coupled to the plurality of RUs via a front-haul ETHERNET interface, wherein the centralized unit is a Distributed Unit (DU) or a Central Unit (CU) configured to operate in a 3GPP Fifth Generation communication system.

18. The method of claim 17, wherein the method is implemented in the centralized unit.

19. The method of claim 12, wherein the predetermined pattern is:
1, 2, 0;
1, 0, 2;
2, 0, 1;

2, 1, 0;
0, 1, 2; or
0, 2, 1.

20. The method of claim 12, wherein sorting the PCI values in the provisioned list by, during each of at least one iterative selection round, selecting up to three PCI values from the provisioned list (P) based on:
remainders of the PCI values divided by the predetermined integer; and
the predetermined pattern.

21. The method of claim 20, wherein the predetermined pattern comprises three different integers: A, B, C;
wherein selecting up to three PCI values comprises, in each selection round:
selecting a first PCI value in the provisioned list, if any, with a remainder of A when divided by the predetermined integer;
selecting a first PCI value in the provisioned list, if any, with a remainder of B when divided by the predetermined integer; and
selecting a first PCI value in the provisioned list, if any, with a remainder of C when divided by the predetermined integer;
wherein if a PCI value has been selected in a previous selection round, it is not considered for selection again.

22. The method of claim 12, wherein selecting, for each sector implemented by the small cell, a PCI value from the sorted list comprises:
determining an index for each sector implemented by the small cell based on a sector ID for the sector; and
for each sector, selecting one of the PCI values from the sorted list based on a respective index for the sector.

23. A small cell for selecting a physical cell identifier (PCI), comprising:
at least one processor configured to:
determine a provisioned list of PCI values;
insert, into a sorted list, at least one of the PCI values in the provisioned list during a first selection round, wherein the at least one of the PCI values is selected for insertion based on a predetermined pattern and modulo X values of elements in the provisioned list, where X is a predetermined integer;
when all the PCI values in the provisioned list have not been inserted into the sorted list, perform at least one additional selection round, one or more of the additional selection rounds being performed based on at least one different predetermined pattern; and
select, for each sector implemented by the small cell, a PCI value from the sorted list based on a sector ID of the sector.

24. The small cell of claim 23, wherein the small cell is implemented using a cloud radio access network (C-RAN), comprising:
at least one radio point (RP), each being configured to exchange radio frequency (RF) signals with at least one user equipment (UE); and
a baseband controller communicatively coupled to the at least one RP via a front-haul ETHERNET network.

25. The small cell of claim 24, wherein the at least one processor is implemented in the baseband controller.

26. The small cell of claim 23, wherein the small cell is implemented using a cloud radio access network (C-RAN), comprising:
a plurality of remote units (RUs), each being configured to exchange radio frequency (RF) signals with at least one user equipment (UE); and
a centralized unit communicatively coupled to the plurality of RUs via a front-haul ETHERNET interface, wherein the centralized unit is a Distributed Unit (DU) or a Central Unit (CU) configured to operate in a 3GPP Fifth Generation communication system.

27. The small cell of claim 26, wherein the at least one processor is implemented in the centralized unit.

28. The small cell of claim 23, wherein a first predetermined pattern is used in the first selection round; a second predetermined pattern is used in a first additional selection round; and a third predetermined pattern is used in a second additional selection round.

29. The small cell of claim 23,
wherein each predetermined pattern comprises modulo X remainders arranged in a particular order;
wherein the PCI values are selected for insertion into the sorted list during each selection round so that their modulo X values are in a same order as the modulo X remainders in a respective predetermined pattern used during the respective selection round.

30. The small cell of claim 23,
wherein a length of each predetermined pattern is equal to a number of sectors implemented by each of the small cell and a neighboring small cell in a cluster;
wherein a number of different patterns used throughout all selection rounds is equal to the predetermined integer (X).

31. The small cell of claim 23, wherein a modulo X value for a first sector implemented by the small cell is different than a modulo X value for a first sector implemented by a neighboring small cell.

32. The small cell of claim 23, wherein the predetermined pattern comprises three different integers: A, B, C;
wherein selecting at least one PCI value for insertion comprises, in each selection round:
selecting a first PCI value in the provisioned list, if any, with a remainder of A when divided by the predetermined integer;
selecting a first PCI value in the provisioned list, if any, with a remainder of B when divided by the predetermined integer; and
selecting a first PCI value in the provisioned list, if any, with a remainder of C when divided by the predetermined integer;
wherein if a PCI value has been selected in a previous selection round, it is not considered for selection again.

33. The small cell of claim 23, wherein selecting, for each sector implemented by the small cell, a PCI value from the sorted list comprises:
determine an index for each sector implemented by the small cell based on a sector ID for the sector; and
for each sector, select one of the PCI values from the sorted list based on a respective index for the sector.

34. A method for selecting a physical cell identifier (PCI) in a small cell, the method comprising:
determining a provisioned list of PCI values;
inserting, into a sorted list, at least one of the PCI values in the provisioned list during a first selection round, wherein the at least one of the PCI values is selected for insertion based on a predetermined pattern and modulo X values of elements in the provisioned list, where X is a predetermined integer;
when all the PCI values in the provisioned list have not been inserted into the sorted list, performing at least one additional selection round, one or more of the additional selection rounds being performed based on at least one different predetermined pattern; and selecting, for each sector implemented by the small cell, a PCI value from the sorted list based on a sector ID of the sector.

35. The method of claim 34, wherein the small cell is implemented using a cloud radio access network (C-RAN), comprising:
   at least one radio point (RP), each being configured to exchange radio frequency (RF) signals with at least one user equipment (UE); and
   a baseband controller communicatively coupled to the at least one RP via a front-haul ETHERNET network.

36. The method of claim 35, wherein the method is implemented in the baseband controller.

37. The method of claim 34, wherein the small cell is implemented using a cloud radio access network (C-RAN), comprising:
   a plurality of remote units (RUs), each being configured to exchange radio frequency (RF) signals with at least one user equipment (UE); and
   a centralized unit communicatively coupled to the plurality of RUs via a front-haul ETHERNET interface, wherein the centralized unit is a Distributed Unit (DU) or a Central Unit (CU) configured to operate in a 3GPP Fifth Generation communication system.

38. The method of claim 37, wherein the method is implemented in the centralized unit.

39. The method of claim 34, wherein a first predetermined pattern is used in the first selection round; a second predetermined pattern is used in a first additional selection round; and a third predetermined pattern is used in a second additional selection round.

40. The method of claim 34, wherein the small cell implements three sectors;
   wherein each predetermined pattern comprises modulo X remainders arranged in a particular order;
   wherein the PCI values are selected for insertion into the sorted list during each selection round so that their modulo X values are in a same order as the modulo X remainders in a respective predetermined pattern used during the respective selection round.

41. The method of claim 34,
   wherein a length of each predetermined pattern is equal to a number of sectors implemented by each of the small cell and a neighboring small cell in a cluster;
   wherein a number of different patterns used throughout all selection rounds is equal to the predetermined integer (X).

42. The method of claim 34, wherein a modulo X value for a first sector implemented by the small cell is different than a modulo X value for a first sector implemented by a neighboring small cell.

43. The method of claim 34, wherein the predetermined pattern comprises three different integers: A, B, C;
   wherein selecting at least one PCI value for insertion comprises, in each selection round:
      selecting a first PCI value in the provisioned list, if any, with a remainder of A when divided by the predetermined integer;
      selecting a first PCI value in the provisioned list, if any, with a remainder of B when divided by the predetermined integer; and
      selecting a first PCI value in the provisioned list, if any, with a remainder of C when divided by the predetermined integer;
   wherein if a PCI value has been selected in a previous selection round, it is not considered for selection again.

44. The method of claim 34, wherein selecting, for each sector implemented by the small cell, a PCI value from the sorted list comprises:
   determine an index for each sector implemented by the small cell based on a sector ID for the sector; and
   for each sector, select one of the PCI values from the sorted list based on a respective index for the sector.

\* \* \* \* \*